United States Patent
Mukahira et al.

(10) Patent No.: US 9,975,266 B2
(45) Date of Patent: May 22, 2018

(54) VENEER ASSEMBLY DEVICE AND VENEER ASSEMBLING METHOD USING THE SAME

(71) Applicant: TAIHEI MACHINERY WORKS, LTD., Aichi (JP)

(72) Inventors: Masato Mukahira, Osaka (JP); Shigetomi Goda, Osaka (JP)

(73) Assignee: TAIHEI MACHINERY WORKS, LTD., Komaki-Shi, Aichi (JP)

(*) Notice: Subject to any disclaimer, the term of this patent is extended or adjusted under 35 U.S.C. 154(b) by 0 days. days.

(21) Appl. No.: 15/555,340

(22) PCT Filed: Nov. 11, 2015

(86) PCT No.: PCT/JP2015/081690
§ 371 (c)(1),
(2) Date: Sep. 1, 2017

(87) PCT Pub. No.: WO2016/157599
PCT Pub. Date: Oct. 6, 2016

(65) Prior Publication Data
US 2018/0036904 A1    Feb. 8, 2018

(30) Foreign Application Priority Data
Mar. 27, 2015 (JP) .................... 2015-066776

(51) Int. Cl.
B65G 21/14    (2006.01)
B27D 1/04     (2006.01)
B65G 43/08    (2006.01)

(52) U.S. Cl.
CPC .............. *B27D 1/04* (2013.01); *B65G 21/14* (2013.01); *B65G 43/08* (2013.01)

(58) Field of Classification Search
CPC ... B27D 1/00; B27D 5/00; B27D 1/04; B27D 1/08; B65G 21/14; B65G 15/26
(Continued)

(56) References Cited

U.S. PATENT DOCUMENTS 3,378,125 A * 4/1968 Fogg ...................... B65G 13/11
                                                     193/35 TE
4,151,906 A * 5/1979 Pfeiffer ............... B32B 38/1858
                                                       198/418.3
(Continued)

FOREIGN PATENT DOCUMENTS

JP    S5123197 Y2    6/1972
JP    S5136576 U     6/1979
(Continued)

OTHER PUBLICATIONS

International Search Report for PCT/JP2015/081690 dated Feb. 2, 2016.
JP Office Action for JP2015-066776 dated Mar. 13, 2017.

*Primary Examiner* — James R Bidwell
(74) *Attorney, Agent, or Firm* — Thomas | Horstemeyer, LLP

(57) ABSTRACT

A movable conveyor 42 of a post-gluing conveyor 33 (sliding extendable roller conveyor) is provided, in a front portion, with a non-driving roller 42d (guiding roller) disposed so as to be inclined toward a reference surface (ruler) 42e at a predetermined angle with respect to a width direction such that a leading end of a veneer is guided toward the reference surface (ruler) 42e (one lateral side) of a movable conveyor 42. When the veneer is detected by a veneer detecting sensor 45 (veneer detecting means), a post-gluing conveyor controller 47 (slide movement control means) retracts the movable conveyor 42 in an extended state, in a contracting direction in a state in which forward rotational driving of a driving roller 42a of the movable conveyor 42 is maintained.

4 Claims, 17 Drawing Sheets

(58) Field of Classification Search
USPC .............. 198/812, 588, 594, 595; 193/35 TE
See application file for complete search history.

(56) References Cited

U.S. PATENT DOCUMENTS

| | | | | |
|---|---|---|---|---|
| 4,704,183 | A * | 11/1987 | Sigerist | ................... B29C 63/04 |
| | | | | 100/211 |
| 5,141,112 | A * | 8/1992 | Holbert | ..................... B07C 5/34 |
| | | | | 209/552 |
| 5,636,728 | A * | 6/1997 | Best | ....................... B65G 13/12 |
| | | | | 193/35 TE |
| 6,003,658 | A * | 12/1999 | Best | ....................... B65G 13/12 |
| | | | | 193/35 TE |
| 2012/0198669 | A1* | 8/2012 | White | ..................... B27N 3/10 |
| | | | | 26/18.5 |

FOREIGN PATENT DOCUMENTS

| | | |
|---|---|---|
| JP | S60177139 U1 | 4/1984 |
| JP | S6225003 A | 7/1985 |
| JP | H10225908 H | 8/1998 |
| JP | 2004299125 A | 10/2004 |

* cited by examiner

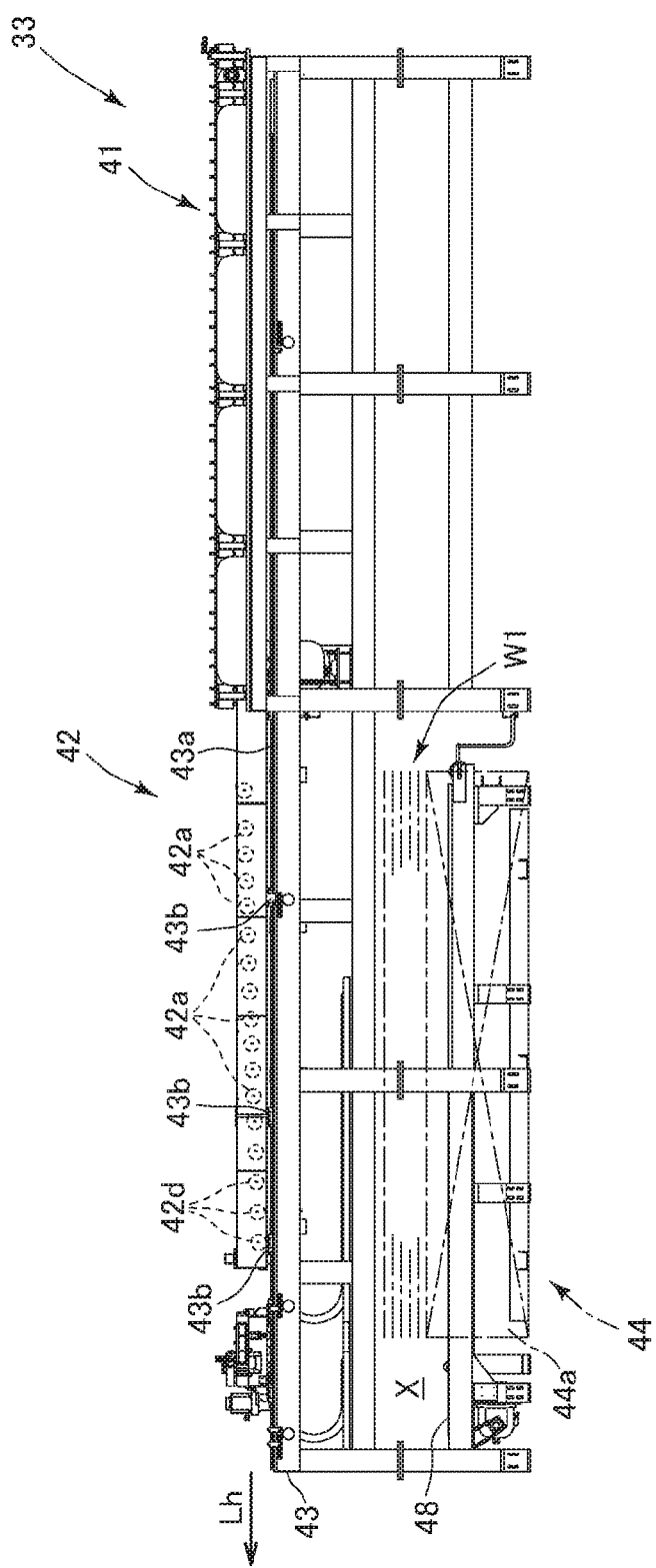

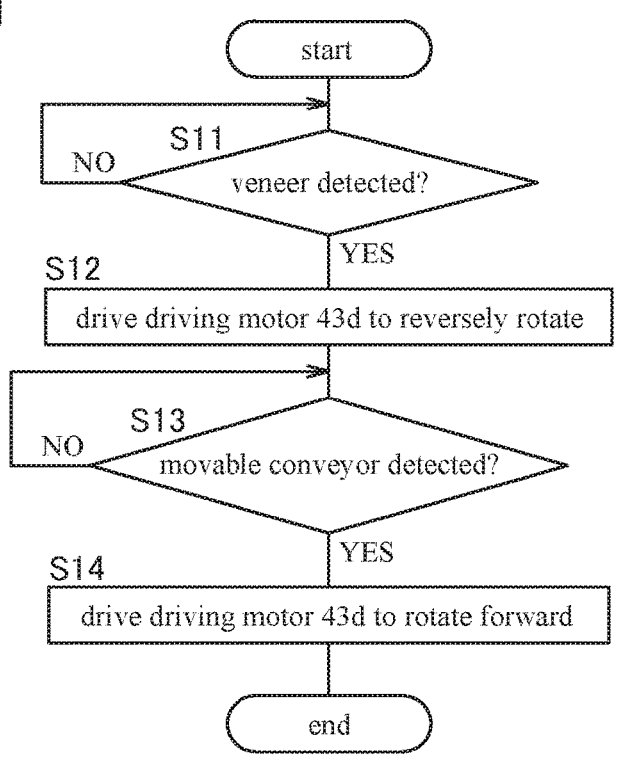

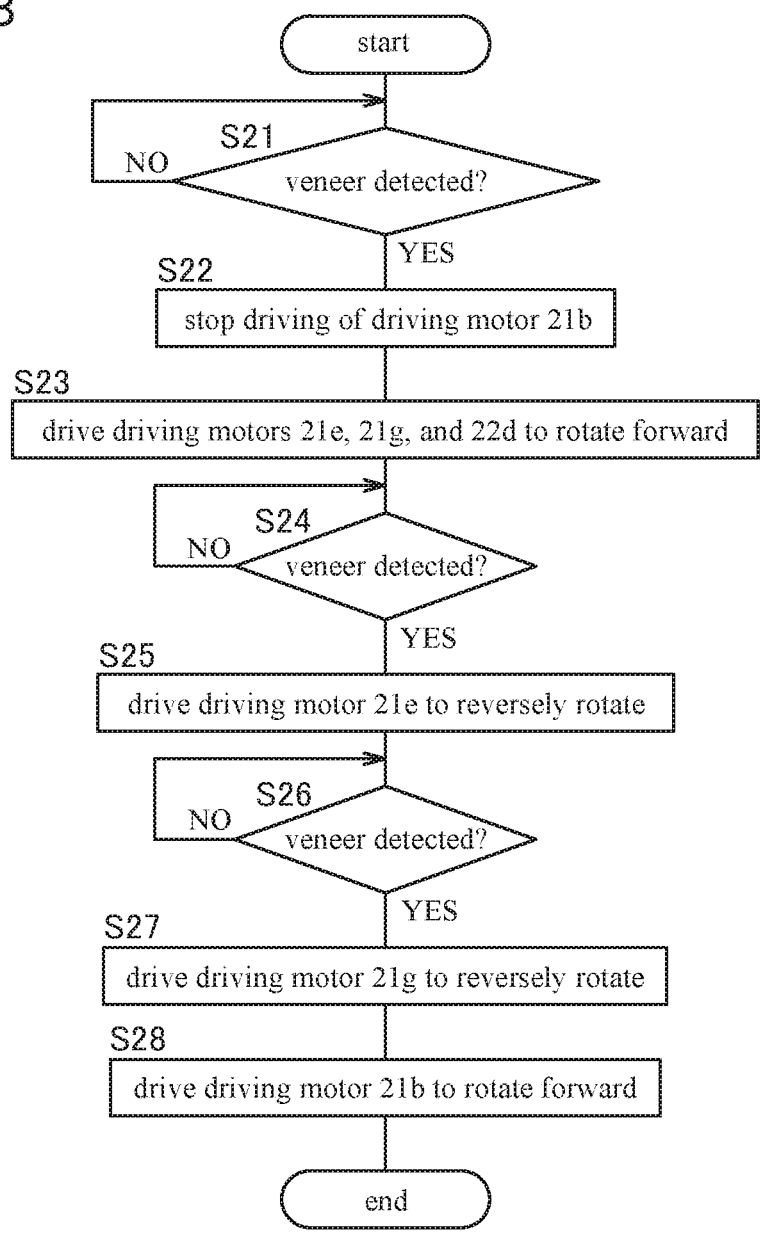

VENEER ASSEMBLY DEVICE AND VENEER ASSEMBLING METHOD USING THE SAME

CROSS-REFERENCE TO RELATED APPLICATION

This application is the 35 U.S.C. § 371 national stage application of PCT Application No. PCT/JP2015/081690, filed Nov. 11, 2015, where the PCT claims priority to and the benefit of, JP Patent Application No. 2015-066776, filed Mar. 27, 2015, which issued as JP Patent No. 5779295 on Jul. 17, 2015, all of which are herein incorporated by reference in their entireties.

BACKGROUND OF THE INVENTION

Field of the Invention

This invention relates to a veneer assembly device and a veneer assembling method using the same.

Description of the Related Art

A device for manufacturing a laminated veneer lumber is known (for example, refer to Patent Document 1 below). In a manufacturing process of an LVL and a plywood, this manufacturing device applies an adhesive to each of a face veneer, a back veneer (face and back veneers), a cross veneer, and a long length scarfed veneer by an upper surface gluing machine, then, conveys them to a predetermined piling position by a roller conveyor, and superimposes them on one another to assemble a predetermined intermediate product. In this manufacturing device, a veneer stopped at a predetermined position of a discharging conveyor is conveyed in an orthogonal direction by a direction changing conveyor, and is finally supported and conveyed from below by an entry/exit conveyor to be piled up in the piling position (stacking position).

CITATIONS LIST

Patent Document

[Patent Document 1] Japanese Laid-Open Patent Publication No. H10-225908

SUMMARY OF INVENTION

Technical Problems

A veneer usually has a thickness of about 2 to 5 mm, and it cannot be said that flatness is necessarily excellent due to knots, grains, and the like, so that when the veneer having a size of about 1.4 m×3 to 4 m, for example, is conveyed to a predetermined position of a discharging conveyor in a slight cycle, it is extremely difficult to pile them so as to be automatically aligned in a piling position. For this reason, conventionally, each time the veneer reaches a predetermined position, this is often visually aligned by a labor-intensive method. On the other hand, according to the manufacturing device disclosed in Patent Document 1, it is possible to automatically align the veneers without the labor-intensive method. However, in the manufacturing device disclosed in Patent Document 1, in order to automatically align the veneers, a new conveyor such as a direction changing conveyor and an entry/exit conveyor is required in addition to the discharging conveyor. This causes problems that a configuration of the entire device tends to become complicated, and a large space is required for the device.

An object of this invention is to provide a veneer assembly device capable of automatically aligning and piling the veneers in a predetermined position of the discharging conveyor while simplifying a configuration of an entire device and eliminating the need for a large space for the device, and to provide a veneer assembling method using the same.

Solutions to Problems and Advantageous Effects of Invention

In order to solve the problems, this invention provides a veneer assembly device being provided with: a sliding extendable roller conveyor including a fixed conveyor and a movable conveyor for conveying a veneer that has been glued to a veneer stopping position corresponding to a position above a predetermined assembling position, the sliding extendable roller conveyor being alternatively switchable between an extended state in which the movable conveyor is advanced so as to be pushed out from an inside to an outside of the fixed conveyor and a contracted state in which the movable conveyor is retracted so as to be pulled from the outside to the inside of the fixed conveyor, the movable conveyor being provided, in its front portion, with a guiding roller disposed so as to be inclined toward one lateral side at a predetermined angle with respect to a width direction orthogonal to a longitudinal direction of the movable conveyor such that a leading end of the veneer is guided toward the one lateral side as a reference surface in the longitudinal direction of the movable conveyor, the veneer assembly device being further provided with: veneer detecting means which detects the veneer reaching the veneer stopping position with a leading-side edge of the veneer being brought into contact with a predetermined stopper member; roller control means which drives each driving roller of the fixed conveyor and the movable conveyor to rotate forward such that the veneer is conveyed to the veneer stopping position; and slide movement control means which controls slide movement of the movable conveyor. The roller control means drives each driving roller of the fixed conveyor and the movable conveyor to rotate forward such that the veneer is continuously conveyed from the fixed conveyor onto the movable conveyor in the extended state of the sliding extendable roller conveyor. When the veneer is detected by the veneer detecting means, the slide movement control means retracts the movable conveyor in the extended state, in a contracting direction in a state in which forward rotational driving of the driving roller of the movable conveyor is maintained by the roller control means, the veneer receives moment of force in a direction to move a rear end of the veneer toward the one lateral side of the movable conveyor with a contact portion of the veneer with the stopper member as a rotational fulcrum by a driving force based on the forward rotational driving of the driving roller of the movable conveyor which is retracting, and the veneer is drawn such that a longitudinal edge runs along the one lateral side of the movable conveyor and the veneer naturally drops from the veneer stopping position to the assembling position in a state in which the leading-side edge is positioned by the stopper member and the longitudinal edge is positioned by the one lateral side of the movable conveyor.

In this case, the guiding roller may be formed of a plurality of non-driving rollers. In addition, the driving roller and the non-driving roller of the movable conveyor may be disposed so as to be inclined downward with respect to a longitudinal horizontal direction of the movable conveyor such that the driving roller and the non-driving roller are located on a lower side toward a forward direction of the movable conveyor. Herein, a "predetermined angle" at which the guiding roller is disposed is desirably set to 1 to 10°, and more preferably 2 to 5° with respect to a reference line in the width direction. In addition, the downward inclination angle of the non-driving roller and the driving roller is desirably set to 1 to 5°, and more preferably 1 to 3° with respect to the reference line in the longitudinal horizontal direction.

Meanwhile, in order to solve the above-described problems, this invention provides a veneer assembling method using a veneer assembly device provided with:

a sliding extendable roller conveyor including a fixed conveyor and a movable conveyor for conveying a veneer that has been glued to a veneer stopping position corresponding to a position above a predetermined assembling position;

the sliding extendable roller conveyor being alternatively switchable between an extended state in which the movable conveyor is advanced so as to be pushed out from an inside to an outside of the fixed conveyor in a longitudinal direction of the fixed conveyor and a contracted state in which the movable conveyor is retracted so as to be pulled from the outside to the inside of the fixed conveyor, the movable conveyor being provided, in its front portion, with a guiding roller disposed so as to be inclined toward one lateral side at a predetermined angle with respect to a width direction orthogonal to a longitudinal direction of the movable conveyor such that a leading end of the veneer is guided to the one lateral side as a reference surface in the longitudinal direction of the movable conveyor, the veneer assembling method being provided with: a veneer conveying step of driving each driving roller of the fixed conveyor and the movable conveyor to rotate forward such that the veneer is continuously conveyed from the fixed conveyor onto the movable conveyor in the extended state of the sliding extendable roller conveyor;

a movable conveyor retracting step of retracting the movable conveyor in the extended state, in a contracting state in a state in which forward rotational driving of the driving roller of the movable conveyor is maintained when the veneer is brought into contact with a predetermined stopper member, with the veneer receiving moment of force in a direction to move a rear end of the veneer toward one lateral side of the movable conveyor with a contact portion of the veneer with the stopper member as a rotational fulcrum by a driving force based on the forward rotational driving of the driving roller of the movable conveyor which is retracting; and a movable conveyor advancing step of advancing the movable conveyor in an extending direction after the movable conveyor retracting step.

In the veneer assembly device and the veneer assembling method using the same of this invention, the movable conveyor is provided, in its front portion, with the guiding roller disposed so as to be inclined toward the one lateral side at a predetermined angle with respect to the width direction orthogonal to the longitudinal direction of the movable conveyor such that the leading end of the veneer is guided toward the one lateral side as the reference surface in the longitudinal direction of the movable conveyor.

With this configuration, when each driving roller of the fixed conveyor and the movable conveyor is driven to rotate forward in the extended state of the sliding extendable roller conveyor, the veneer changes its course such that the leading end thereof is directed toward the one lateral side of the movable conveyor.

When the veneer is brought into contact with the stopper member, the movable conveyor retracts in the contracting direction in a state in which the forward rotational driving of the driving roller of the movable conveyor is maintained. Force in a direction to press the veneer against the stopper member acts on the veneer and force in a direction to draw the veneer toward the one lateral side of the movable conveyor acts on the veneer, due to a driving force based on the forward rotational driving of the driving roller of the movable conveyor. That is to say, on the veneer, moment of force in a direction to move the rear end thereof to the one lateral side of the movable conveyor with the contact portion of the veneer with the stopper member as the rotational fulcrum acts.

Accordingly, the veneer is drawn such that the longitudinal edge thereof runs along the one lateral side of the movable conveyor and the veneer naturally drops to the assembling position from a leading end side of the veneer which is no longer supported by the movable conveyor in a state in which the leading-side edge is positioned by the stopper member and the longitudinal edge is positioned by the one lateral side of the movable conveyor, and the veneers stacked in the assembling position are automatically aligned. In this manner, it is possible to automatically align the veneers in the assembling position by using only the conveying conveyor for conveying the veneer to the veneer stopping position corresponding to the position above the assembling position.

Meanwhile, In the practice of this invention, a turn-over device for turning over a veneer is provided with a first belt wound between a large-diameter first drum member and a small-diameter second drum member, a second belt wound around the first drum member so as to be pressed against the first belt, driving means which drives the second belt to rotate, and supplying means capable of supplying the veneer on a conveying conveyor between the first belt and the second belt. The turn-over device can be configured such that the veneer supplied between the first belt and the second belt by the supplying means is turned over along a circumferential surface of the first drum member in a state of being interposed between the second belt and the first belt following the second belt in accordance with the rotation of the second belt, and is guided by the first belt which is inclined downward so as to extend obliquely downward from the first drum member to the second drum member to be ejected onto the supplying means.

With this configuration, the turned over veneer can be smoothly ejected onto the supplying means, and can be satisfactorily prevented from being damaged due to dropping or the like.

In addition, in the practice of this invention, when the adhesive is applied to the cross veneer, it is possible to adopt a veneer superimposing method including a parallel veneer standby step of allowing a parallel veneer glued by a gluing device to stand by on a post-gluing conveyor, across veneer moving step of moving cross veneers one by one from a predetermined position of a cross veneer supply device to a pre-gluing conveyor, a cross veneer positioning step of positioning the cross veneer in a reference position of the pre-gluing conveyor, a cross veneer standby step of allowing the cross veneer that has been positioned to stand by in a position above the pre-gluing conveyor, a parallel veneer returning step of returning the parallel veneer in the standby state onto the pre-gluing conveyor, a parallel veneer positioning step of positioning the parallel veneer that has been returned in the reference position of the pre-gluing conveyor, a superimposing step of superimposing the cross veneer in the standby state on the parallel veneer that has been positioned, and a superimposed veneer gluing step of gluing an upper surface of the cross veneer on the parallel veneer.

With the veneer superimposing method, since both the parallel veneer and the cross veneer are positioned in the reference position of the pre-gluing conveyor, it is possible to obtain the superimposed veneer in which the corresponding edges of the parallel veneer and the cross veneer substantially align with each other. In addition, the adhesive applying roller applies high roller pressure and adhesive force to the superimposed veneer in which the cross veneer is superimposed on the parallel veneer, as compared with a case of the parallel veneer, so that the parallel veneer and the cross veneer easily fit in each other, and are bonded with a high degree of adhesion. Furthermore, in a case of a bonding method using the adhesive applying roller, if a roller axis is parallel to the fiber direction, the veneer might be pulled into the roller. Thus, dedicated adhesive applying rollers are conventionally often used for the parallel veneer and the cross veneer in order that the roller axis may be orthogonal to the fiber direction. However, in a case of applying the adhesive to the cross veneer as in this embodiment, the superimposed veneer in which the cross veneer is superimposed on the parallel veneer is less likely to be pulled into the roller, so that it is sufficient to use only the adhesive applying roller for the parallel veneer. Accordingly, it is possible to satisfactorily apply the adhesive to the upper surface of the cross veneer while simplifying the facility.

BRIEF DESCRIPTION OF DRAWINGS

FIG. 10 is a front view of the assembly device of FIG. 9.

FIG. 11 is a flowchart illustrating an assembling process executed by the assembly device of FIG. 9.

FIG. 13 is a flowchart illustrating a turn-over process executed by the turn-over device in FIG. 5.

DESCRIPTION OF EMBODIMENTS

Hereinafter, an embodiment of this invention is described with reference to the drawings.

First Embodiment

Figure 1A:
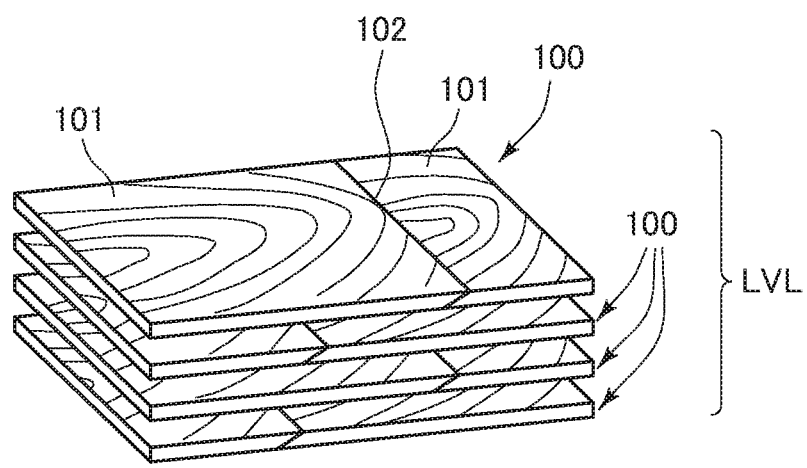
FIG. 1A is a schematic view illustrating an example of a LVL.
Figure 1B:
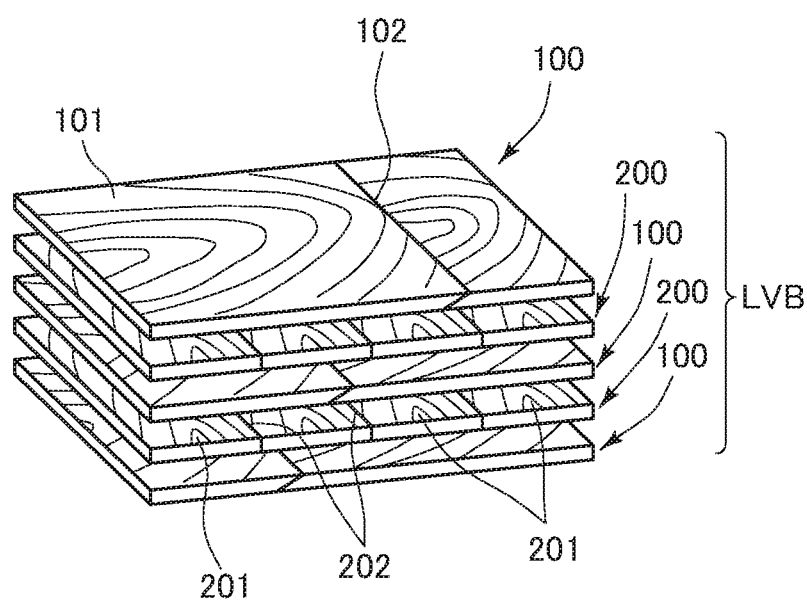
FIG. 1B is a schematic view illustrating an example of a LVB.

FIG. 1 illustrates an example of a veneer to be assembled according to a first embodiment. Specifically, FIG. 1A illustrates an example of a laminated veneer lumber (LVL) formed of parallel veneers 100. Each of the parallel veneers 100 is a veneer of a predetermined size (for example, 1.4 m×4 m). The parallel veneer 100 is obtained by connecting veneer pieces 101, which are cut by a cutting machine such as a rotary lathe, via a connecting portion 102 such that fiber directions of the veneer pieces 101 are parallel to a longitudinal direction of the veneer. FIG. 1B illustrates an example of a laminated veneer board (LVB) obtained by arbitrarily combining the parallel veneer 100 and a cross veneer 200. The cross veneer 200 is a veneer of a predetermined size and is obtained by connecting veneer pieces 201 via a connecting portion 202 such that fiber directions of the veneer pieces 201 are orthogonal to the longitudinal direction of the veneer. Meanwhile, it goes without saying that the parallel veneer and the cross veneer without the connecting portions 102 and 202, respectively, may also be subjected to assembly of the first embodiment.

Figure 2:
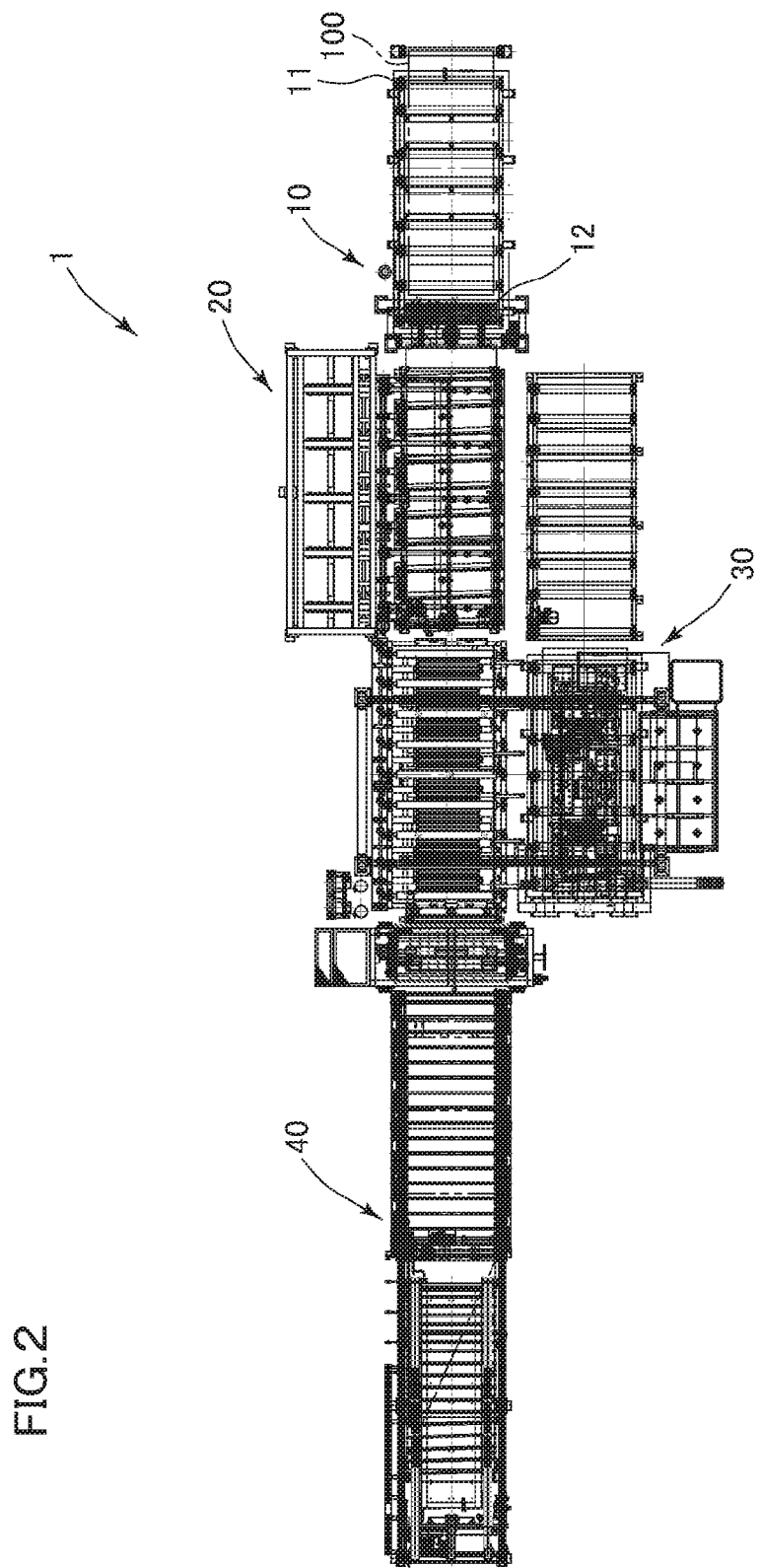
FIG. 2 is a plan view illustrating a lay-up device according to a first embodiment of this invention.
Figure 3:
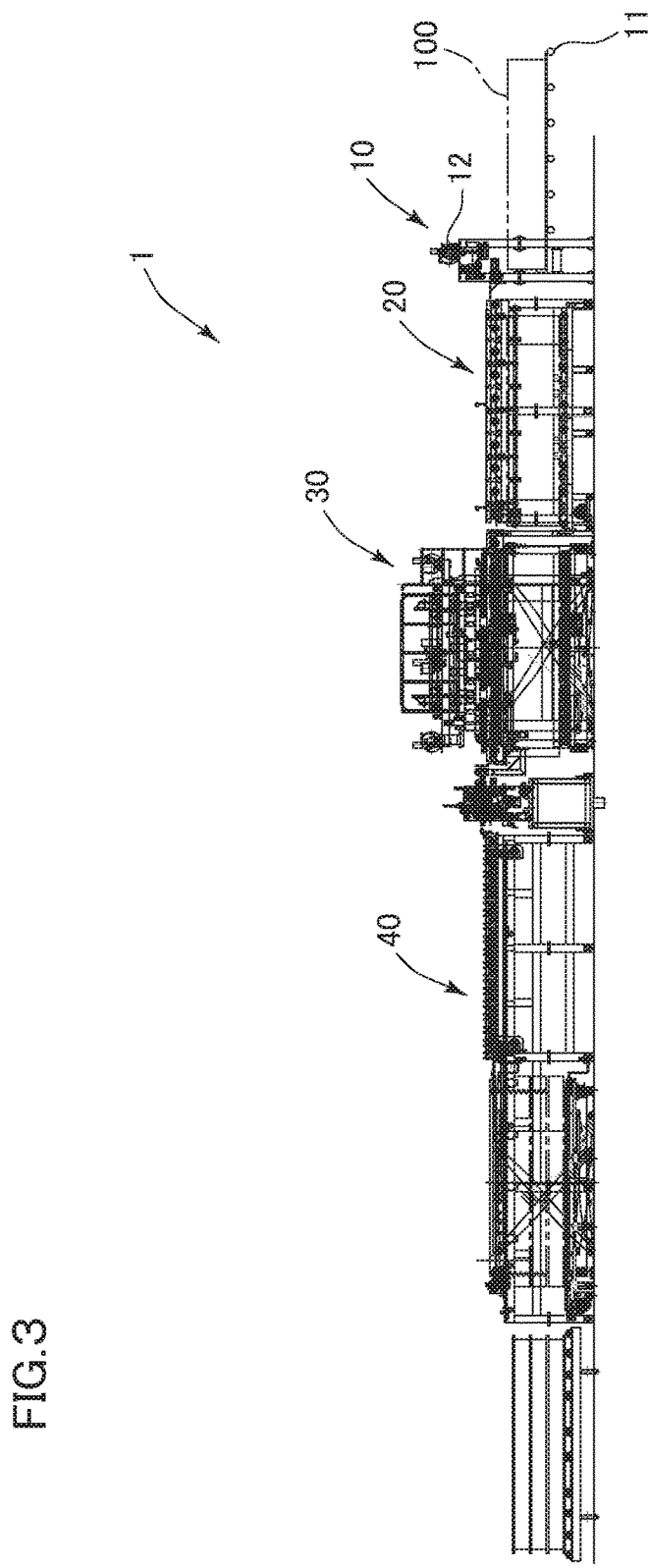
FIG. 3 is a front view of FIG. 2.
Figure 4:
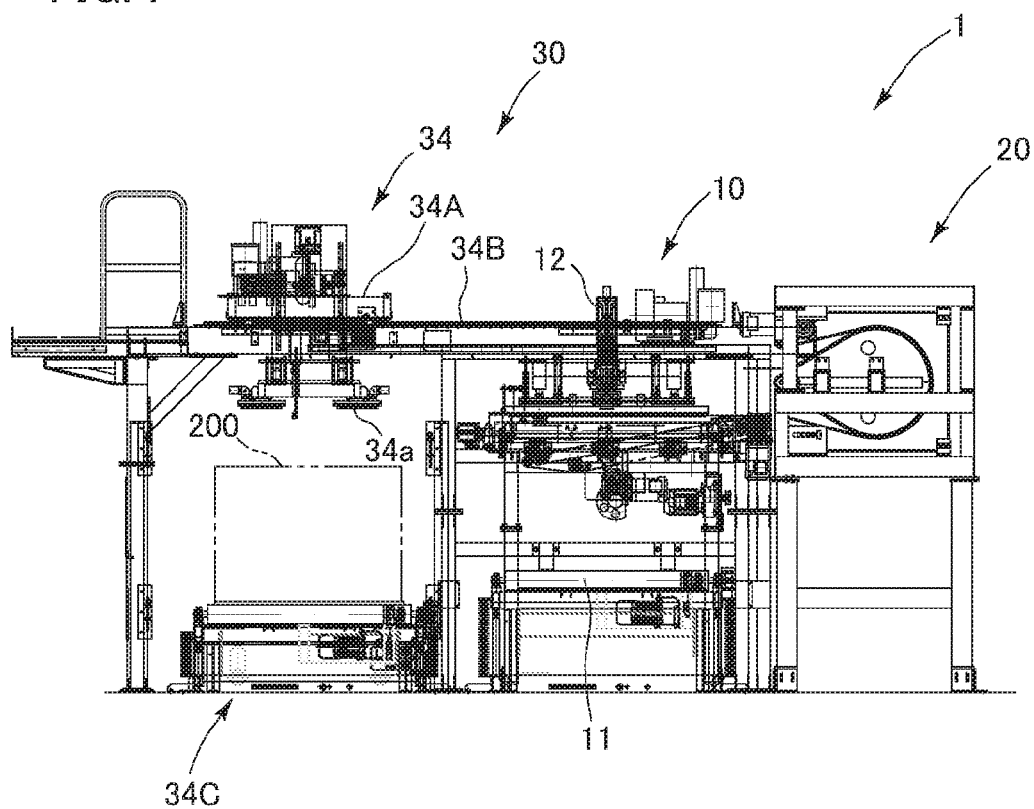
FIG. 4 is a side view of FIG. 2.

In order to manufacture the above-described LVL and LVB and a plywood, a lay-up device 1 serves as a single line that automates steps from introduction (input) of the veneer to assembly thereof. As illustrated in FIGS. 2 to 4, the lay-up device 1 is provided with an introduction device 10, a turn-over device 20, a superimposition device 30, and an assembly device 40 in this order from an upstream side in a conveying direction of the veneer.

As illustrated in FIGS. 2 and 3, the introduction device 10 is provided with well-known veneer mounting conveyor 11 and veneer feeding mechanism 12. The veneer feeding mechanism 12 sucks to lift up the veneers 100 stacked on the veneer mounting conveyor 11 one by one and supplies the same to the turn-over device 20.

The turn-over device 20 is next described.

Figure 5:
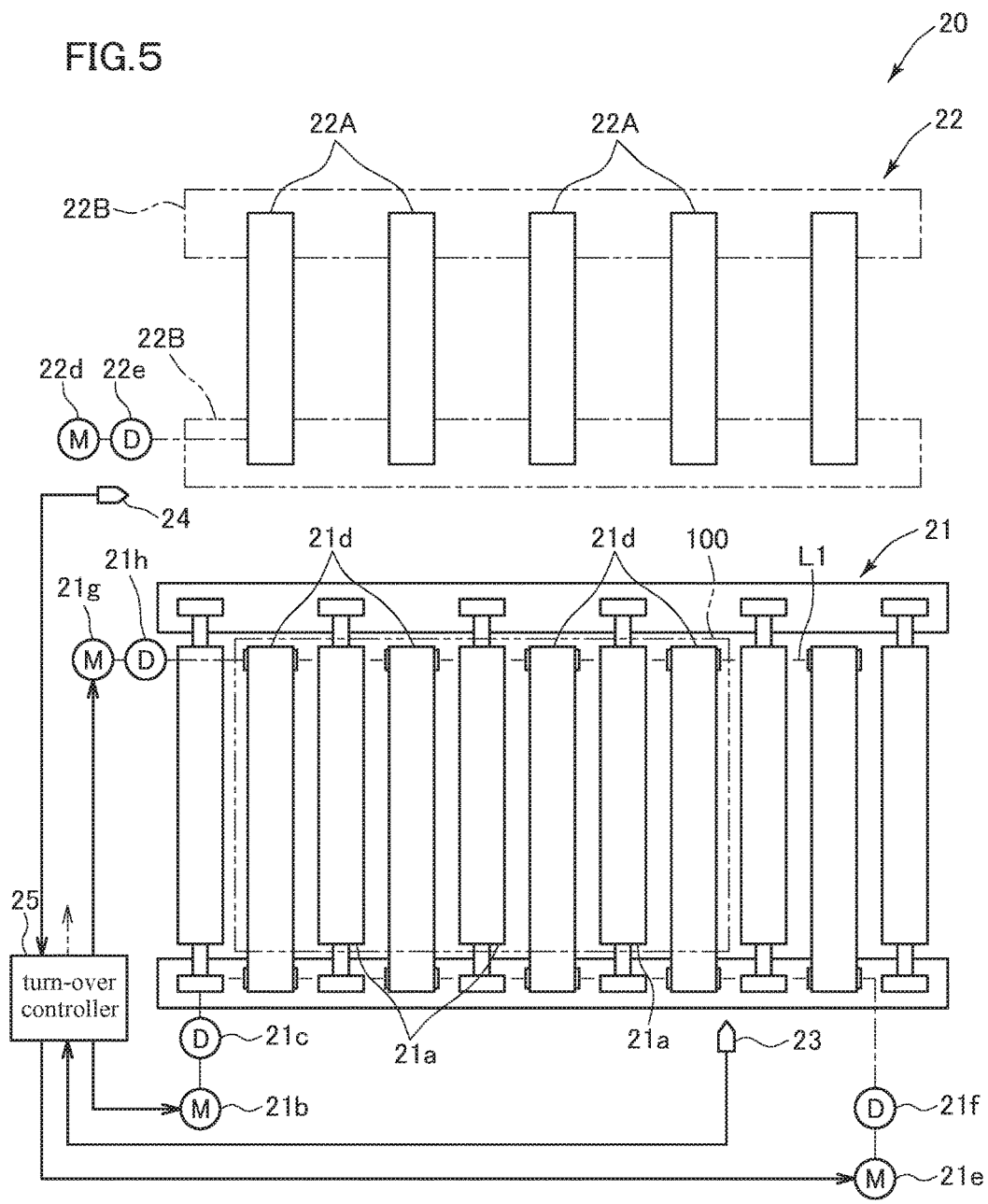
FIG. 5 is a block diagram of a turn-over device.
Figure 6:
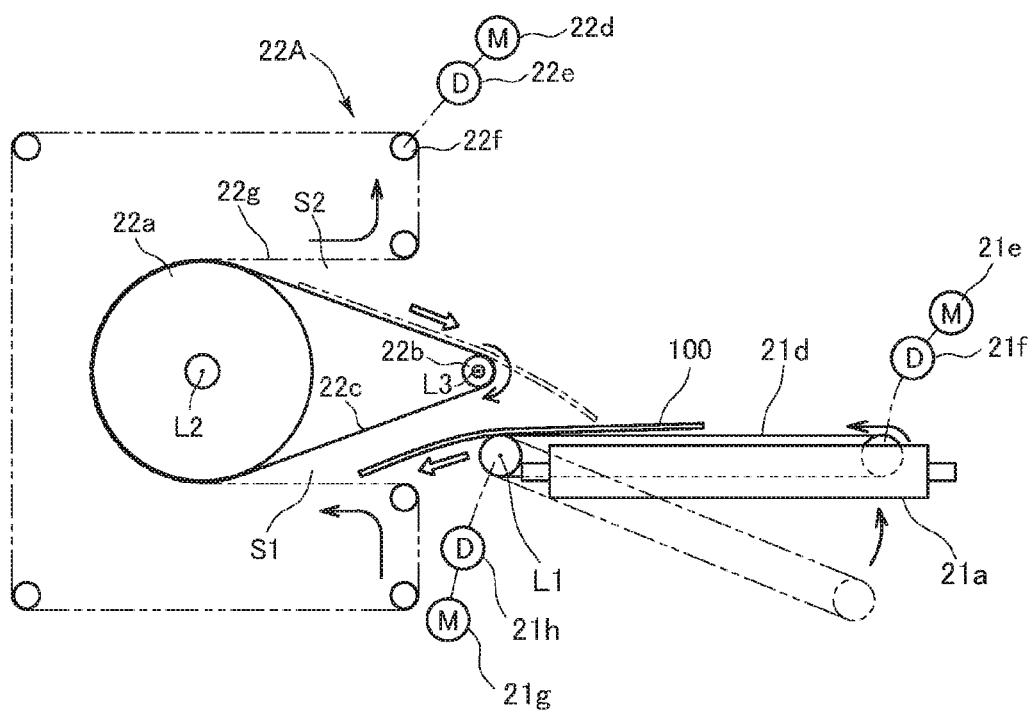
FIG. 6 is a side view schematically illustrating the turn-over device of FIG. 5.

The turn-over device 20 has a function of turning over the parallel veneer 100. As illustrated in FIGS. 5 and 6, the turn-over device 20 is provided with a direction switching conveyor 21, a turn-over mechanism 22, veneer detecting sensors 23 and 24, a turn-over controller 25, and the like. The direction switching conveyor 21 is provided with a plurality of driving rollers 21a which feeds the parallel veneer 100 in a normal conveying direction (a longitudinal direction of the direction switching conveyor 21), and a transmitting mechanism 21c which transmits a driving force of a driving motor 21b to each driving roller 21a.

The direction switching conveyor 21 is also provided with a plurality of belt conveyors 21d which feeds the parallel veneer 100 in a direction orthogonal to the normal conveying direction (a width direction of the direction switching conveyor 21), and a transmitting mechanism 21f which transmits a driving force of a driving motor 21e to each belt conveyor 21d.

Each belt conveyor 21d (supplying means) is rotatable around a roller axis L1 on a side of the turn-over mechanism 22. The direction switching conveyor 21 is provided with a transmitting mechanism 21h which transmits a driving force of a driving motor 21g to each belt conveyor 21d in relation to the rotation movement of each belt conveyor 21d rotated around the roller axis L1. The transmitting mechanism 21h may switch between an original position (refer to a chain double-dashed line in FIG. 6) in which a belt upper surface of each belt conveyor 21d is positioned below a roller upper surface of the driving roller 21a and an operating position (refer to a solid line in FIG. 6) in which the belt upper surface of each belt conveyor 21d is positioned above the roller upper surface of the driving roller 21a by forward rotational driving of the driving motor 21g.

The turn-over mechanism 22 is provided with a plurality of units 22A (in FIG. 5, five units 22A are illustrated) each including a large-diameter drum 22a (first drum member), a small-diameter drum 22b (second drum member), an inner belt 22c (first belt), and an outer belt 22g (second belt). The large-diameter drum 22a and the small-diameter drum 22b are rotatably supported respectively around axes L2 and L3 extending parallel to the roller axis L1 of each belt conveyor 21d with respect to a base member 22B. The inner belt 22c is wound between the drums 22a and 22b. The outer belt 22g is wound around the large-diameter drum 22a so as to be pressed against the inner belt 22c. Each outer belt 22g is synchronously driven by a driving force transmitted from a driving motor 22d to a driving roller 22f through a transmitting mechanism 22e as the entire unit 22A. Each inner belt 22c follows rotation of the corresponding outer belt 22g.

Accordingly, when each belt conveyor 21d in the operating position is driven to rotate forward, the parallel veneer 100 is supplied into a lower space S1 formed between the inner belt 22c and the outer belt 22g, rotates clockwise in FIG. 6 along a circumferential surface of the large-diameter drum 22a in a state of being interposed between the inner belt 22c and the outer belt 22g to be turned over, and is ejected from an upper space S2 to each belt conveyor 21d. The parallel veneer 100 is guided by the inner belt 22c which is inclined downward so as to extend obliquely downward, fed onto each belt conveyor 21d by reverse rotational driving of each belt conveyor 21d, and mounted on the driving roller 21a by return of each belt conveyor 21d to the original position.

The veneer detecting sensor 23 is a contact detector or a transmission- or reflection-type non-contact detector. The veneer detecting sensor 23 outputs a veneer detection signal to the turn-over controller 25 when detecting the parallel veneer 100 reaching a predetermined position on the direction switching conveyor 21. Meanwhile, by providing a plurality of veneer detecting sensors 23 in the longitudinal direction and the width direction of the direction switching conveyor 21, for example, even when the sizes of the parallel veneers 100 to be conveyed are different, it is possible to improve the detection accuracy of the parallel veneers 100.

The veneer detecting sensor 24 is a contact detector or a transmission- or reflection-type non-contact detector. The veneer detecting sensor 24 outputs a veneer detection signal to the turn-over controller 25 when detecting the parallel veneer 100 discharged from the unit 22A. Meanwhile, by providing a plurality of veneer detecting sensors 24 in the longitudinal direction of the direction switching conveyor 21, for example, even when the sizes of the parallel veneers 100 discharged from the unit 22A are different, it is possible to improve the detection accuracy of the parallel veneers 100.

The turn-over controller 25 includes, as a main component, a microcomputer formed of a CPU, a ROM, a RAM, an input/output interface circuit, and the like. For example, a turn-over control program is stored in the ROM. The turn-over controller 25 controls the driving motor 21b of the driving roller 21a, the driving motors 21e and 21g of the belt conveyor 21d, the driving motor 22d of the turn-over mechanism 22, and the like in accordance with a predetermined order on the basis of the veneer detection signals from the veneer detecting sensors 23 and 24.

The superimposition device 30 is next described.

Figure 7:
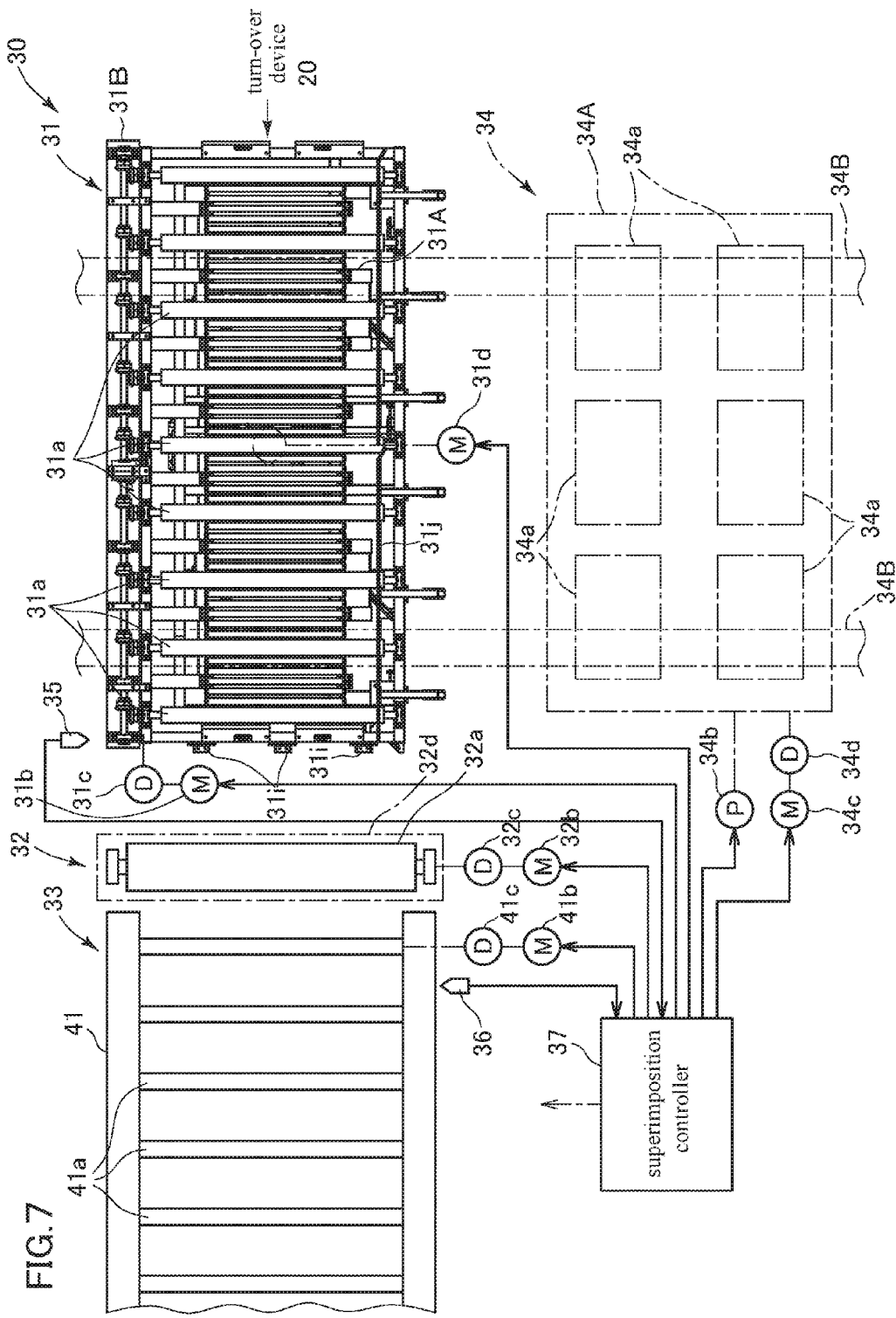
FIG. 7 is a block diagram of a superimposition device.

The superimposition device 30 has a function of manufacturing a superimposed veneer 300 (refer to FIG. 15G) in which the cross veneer 200 is superimposed on the parallel veneer 100 such that corresponding edges of the parallel veneer 100 and the cross veneer 200 are substantially align with each other. As illustrated in FIGS. 4 and 7, the superimposition device 30 is provided with a pre-gluing conveyor 31, a gluing device 32, a post-gluing conveyor 33, a cross veneer supply device 34, veneer detecting sensors 35 and 36, a superimposition controller 37, and the like. The pre-gluing conveyor 31, the gluing device 32, and the post-gluing conveyor 33 are substantially linearly disposed in this order from the upstream side in the conveying direction of the parallel veneer 100. The cross veneer supply device 34 is disposed on one lateral side of the pre-gluing conveyor 31.

Figure 8A:
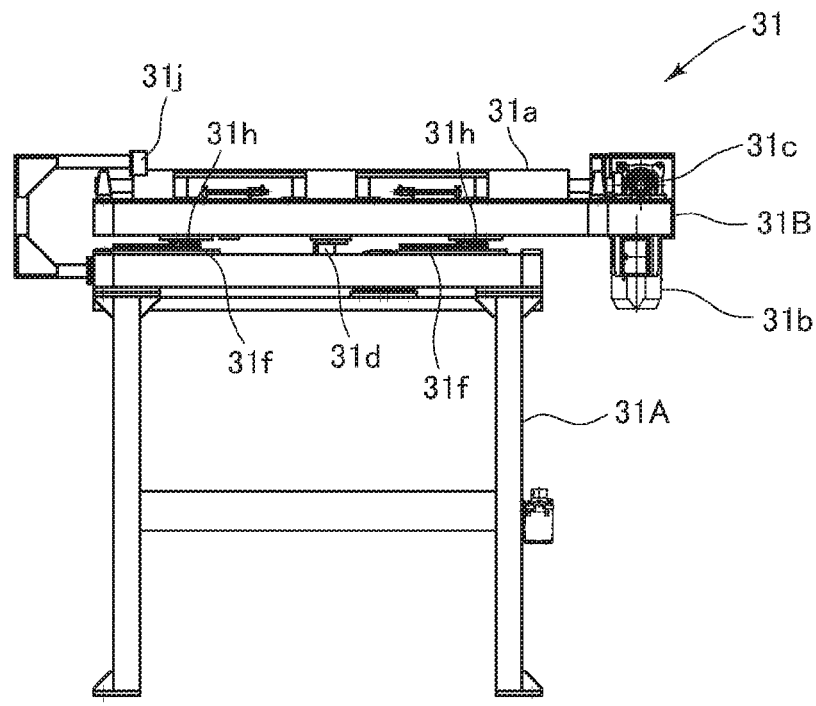
FIG. 8A is a side view of a pre-gluing conveyor of FIG. 7.
Figure 8B:
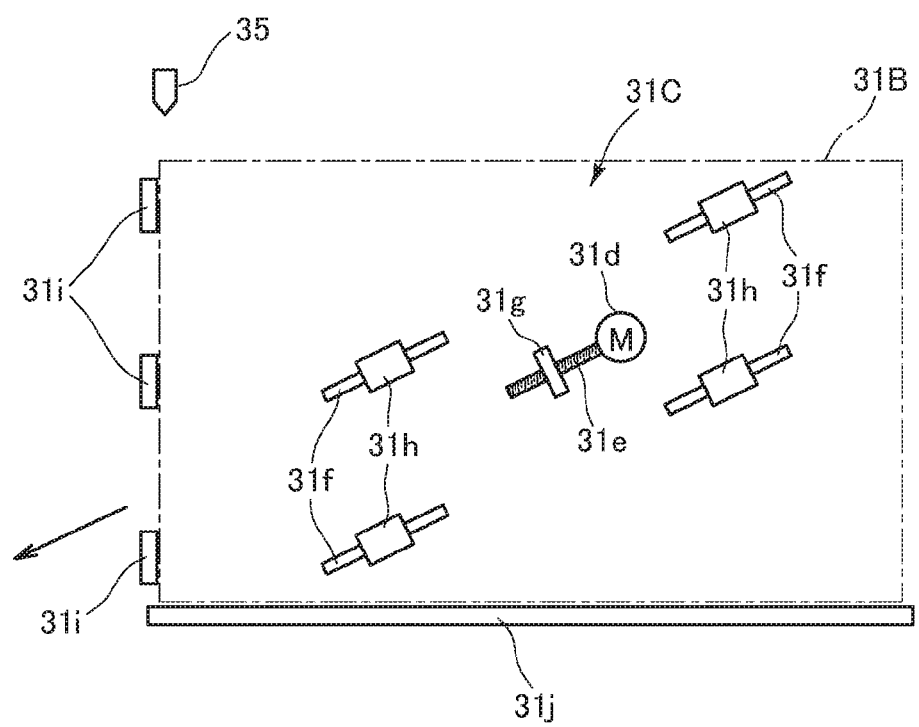
FIG. 8B is an illustration diagram schematically illustrating a position adjusting mechanism of FIG. 8A.

As illustrated in FIGS. 7, 8A, and 8B, the pre-gluing conveyor 31 is provided with a fixed frame 31A and a movable frame 31B supported by the fixed frame 31A so as to be movable in a horizontal direction. The movable frame 31B is provided with a plurality of driving rollers 31a which feeds the parallel veneer 100, the cross veneer 200, or the superimposed veneer 300 in the normal conveying direction, and a transmitting mechanism 31c which transmits a driving force of a driving motor 31b to each driving roller 31a.

As a position adjusting mechanism 31C for positioning the veneer, the fixed frame 31A is provided with a ball screw 31e driven by a driving motor 31d (screw driving unit) and a plurality of guide rails 31f (in FIG. 8B, four guide rails are illustrated), and the movable frame 31B is provided with a ball screw nut 31g threadably mounted on the ball screw 31e and a sliding block 31h slidably fitted to each guide rail 31f.

In addition, the fixed frame 31A is provided with a plurality of stopper members 31i (in FIG. 8B, three stopper members are illustrated) which may be brought into contact with a leading-side edge of the parallel veneer 100 or the cross veneer 200 and a ruler member 31j which may be brought into contact with one of longitudinal edges of the parallel veneer 100 or the cross veneer 200.

When the driving motor 31d is driven in a state in which the parallel veneer 100 or the cross veneer 200 is conveyed on the pre-gluing conveyor 31 and the leading-side edge thereof is brought into contact with the stopper member 31i to stop, the movable frame 31B moves in a direction indicated by an arrow in FIG. 8B with respect to the fixed frame 31A. Accordingly, the veneer on the movable frame 31B is positioned in a reference right angle direction, that is to say, the leading-side edge of the veneer is positioned by each stopper member 31*i* and one of the longitudinal edges of the veneer is positioned by the ruler member 31*j* to be mounted in a reference position of the movable frame 31B.

Returning to FIG. 7, the gluing device 32 is provided with a well-known transferring roller 32*a* (adhesive applying roller) capable of applying an adhesive to an upper surface of the parallel veneer 100 or the superimposed veneer 300 (hereinafter, they are simply and collectively referred to as the veneer), and a transmitting mechanism 32*c* which transmits a driving force of a driving motor 32*b* to the transferring roller 32*a*. Furthermore, the gluing device 32 is provided with a lifting mechanism 32*d* capable of adjusting a position of the gluing device 32 between an application position where the transferring roller 32*a* is brought into contact with the upper surface of the veneer and a non-application position where this is separated from the upper surface of the veneer.

In the first embodiment, a part of the post-gluing conveyor 33 also serves as the assembly device 40. For this reason, the post-gluing conveyor 33 is described later.

The cross veneer supply device 34 supplies the cross veneers 200 stacked on a loading device 34C one by one to the pre-gluing conveyor 31 when the LVB is manufactured (refer to FIG. 4). The cross veneer supply device 34 is provided with: a main body 34A including a plurality of suction pads 34*a* (in FIG. 7, six suction pads are illustrated) and a lifting mechanism capable of lifting the suction pads 34*a* up and down; a pair of guide rails 34B for moving the main body 34A sucking the cross veneer 200 from the loading device 34C onto the pre-gluing conveyor 31; a suction source 34*b* which generates a suction force for sucking the cross veneer 200; and a driving motor 34*c* and a transmitting mechanism 34*d* which are configured to reciprocate the main body 34A along the guide rail 34B.

The veneer detecting sensor 35 is a contact detector or a transmission- or reflection-type non-contact detector. The veneer detecting sensor 35 operates when the LVB is manufactured. When detecting a leading edge of the parallel veneer 100 on the pre-gluing conveyor 31, the veneer detecting sensor 35 outputs a detection signal to the superimposition controller 37. Meanwhile, by providing a plurality of veneer detecting sensors 35 in a longitudinal direction and a width direction of the pre-gluing conveyor 31, for example, even when the sizes of the veneers 100 to be conveyed are different, it is possible to improve the detection accuracy of the veneer 100.

The veneer detecting sensor 36 is a contact detector or a transmission- or reflection-type non-contact detector. The veneer detecting sensor 36 operates when the LVB is manufactured. When detecting a terminal end of the parallel veneer 100 on the post-gluing conveyor 33, the veneer detecting sensor 36 outputs a detection signal to the superimposition controller 37. Meanwhile, by providing a plurality of veneer detecting sensors 36 in a longitudinal direction and a width direction of the post-gluing conveyor 33, for example, even when the sizes of the veneers 100 to be conveyed are different, it is possible to improve the detection accuracy of the veneer 100.

The superimposition controller 37 includes, as a main component, a microcomputer formed of a CPU, a ROM, a RAM, an input/output interface circuit, and the like. For example, a superimposition control program is stored in the ROM. The superimposition controller 37 controls the suction source 34*b* and the driving motor 34*c* of the cross veneer supply device 34, the driving motor 31*b* of the driving roller 31*a* and the driving motor 31*d* of the pre-gluing conveyor 31, the driving motor 32*b* of the transferring roller 32*a* and the lifting mechanism 32*d* of the gluing device 32, a driving motor 41*b* of a driving roller 41*a* of the post-gluing conveyor 33, and the like in accordance with a predetermined order on the basis of the detection signals of the veneer detecting sensors 35 and 36.

The assembly device 40 is next described.

Figure 9:
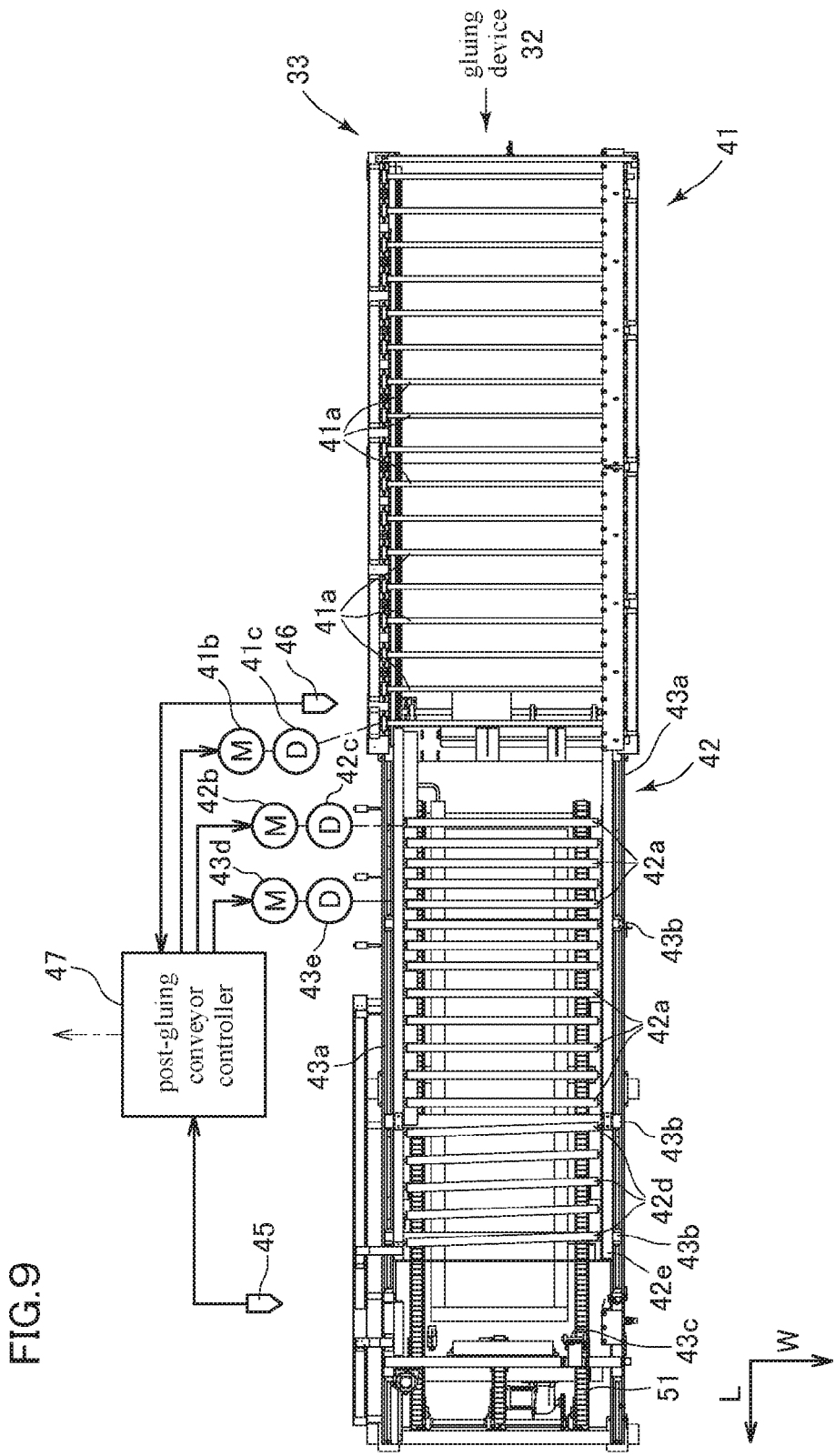
FIG. 9 is a block diagram of an assembly device.

As illustrated in FIGS. 9 and 10, the assembly device 40 is provided with the post-gluing conveyor 33, a loading device 44, a veneer detecting sensor 45, a conveyor detecting sensor 46, a post-gluing conveyor controller 47, and the like. The post-gluing conveyor 33 is a sliding extendable roller conveyor, disposed on a downstream side of the gluing device 32, for conveying the veneer after gluing to a veneer stopping position Y (refer to FIG. 12A), that is to say, a position corresponding to a position above a predetermined assembling position X in the loading device 44. The post-gluing conveyor 33 is provided with a fixed conveyor 41 and a movable conveyor 42 provided on a fixed frame 43.

Then, the post-gluing conveyor 33 is alternatively switchable between an extended state in an extended position in which the movable conveyor 42 is advanced (moved forward) so as to be pushed out from an inside to an outside of the fixed conveyor 41 and a contracted state in a contracted position in which the movable conveyor 42 is retracted (moved backward) so as to be pulled from the outside to the inside of the fixed conveyor 41.

A pair of guide rails 43*a* set to have an inner width dimension substantially the same as an outer width dimension of the movable conveyor 42 is laid on the fixed frame 43 in a longitudinal direction of the fixed frame 43 from the inside to the outside of the fixed conveyor 41. The movable conveyor 42 is slidable along the guide rail 43*a* through sliding blocks 43*b* provided at a predetermined interval.

A stopper member 43*c* is provided on the fixed frame 43 so as to correspond to the veneer stopping position Y. The stopper member 43*c* is brought into contact with the leading-side edge of the veneer to prevent advance of the veneer, and is provided close to one lateral side (lower side in FIG. 9) with respect to a center line of the fixed frame 43.

The fixed conveyor 41 is provided with a plurality of driving rollers 41*a* which feeds the veneer in a longitudinal direction of the fixed conveyor 41 and a transmitting mechanism 41*c* which transmits a driving force of the driving motor 41*b* to each driving roller 41*a*. Meanwhile, when the superimposed veneer 300 is manufactured, the driving motor 41*b* is controlled to be driven to rotate forward or reversely by the superimposition controller 37.

The movable conveyor 42 is provided, in its a rear portion, with a plurality of driving rollers 42*a*, a transmitting mechanism 42*c* which transmits a driving force of a driving motor 42*b* to each driving roller 42*a*, and a driving motor 43*d* and a transmitting mechanism 43*e* which allow the movable conveyor 42 itself to advance and retract along the guide rail 43*a*.

The movable conveyor 42 is provided, in its front portion, with a plurality of non-driving rollers 42*d* (in the first embodiment, five non-driving rollers are illustrated). The non-driving roller 42*d* (guiding roller) is disposed so as to be inclined toward a reference surface (ruler) 42*e* at a predetermined angle (for example, 2 to 5°) with respect to a width direction W orthogonal to a longitudinal direction L of the movable conveyor 42 in order to guide the leading end of the veneer being conveyed toward an inner side surface of the reference surface (ruler) 42*e* (one lateral side: a frame on a lower side in FIG. 9) of the movable conveyor 42.

The driving roller 42*a* and the non-driving roller 42*d* are disposed so as to be inclined downward with respect to a longitudinal horizontal direction Lh of the movable conveyor 42 such that the driving roller 42a and the non-driving roller 42d are located on a lower side toward a forward direction of the movable conveyor 42 (refer to FIG. 10).

The loading device 44 located below the movable conveyor 42 in the extended state receives the veneer naturally dropping from the veneer stopping position Y to stack the veneer. A stacking position of the veneers corresponds to the assembling position X. The loading device 44 is provided with a lifting mechanism 44a capable of lifting up and down so as to load stacked assembled veneers W1 on a discharging belt conveyor 48. The stacked assembled veneers W1 are discharged out of the movable conveyor 42 by the discharging belt conveyor 48.

The veneer detecting sensor 45 is a contact detector or a transmission- or reflection-type non-contact detector. When detecting the leading end of the veneer on the movable conveyor 42, the veneer detecting sensor 45 outputs a detection signal to the post-gluing conveyor controller 47. Meanwhile, by providing a plurality of veneer detecting sensors 45 in a longitudinal direction and a width direction of the fixed frame 43, even when the sizes of the veneers to be conveyed are different, it is possible to improve the detection accuracy of the veneer. The veneer detecting sensor 45 corresponds to veneer detecting means of this invention.

The conveyor detecting sensor 46 is a contact detector or a transmission- or reflection-type non-contact detector. When detecting a front end of the movable conveyor 42 retracted to the contracted position, the conveyor detecting sensor 46 outputs a detection signal to the post-gluing conveyor controller 47. Meanwhile, by providing a plurality of conveyor detecting sensors 46 in the longitudinal direction and the width direction of the fixed frame 43, it is possible to improve the detection accuracy of the movable conveyor 42.

The post-gluing conveyor controller 47 includes, as a main component, a microcomputer formed of a CPU, a ROM, a RAM, an input/output interface circuit, and the like. For example, a post-gluing conveyor control program is stored in the ROM. The post-gluing conveyor controller 47 controls driving of the driving motor 41b of the fixed conveyor 41 and driving of the driving motor 42b of the movable conveyor 42. In addition, the post-gluing conveyor controller 47 controls the driving motor 43d, which allows the movable conveyor 42 to advance and retract, in accordance with a predetermined order on the basis of the detection signals of the veneer detecting sensor 45 and the conveyor detecting sensor 46. The post-gluing conveyor controller 47 corresponds to roller control means and slide control means of this invention.

Operation of the lay-up device 1 configured in the above-described manner is next described. Herein, out of the introduction device 10, the turn-over device 20, the superimposition device 30, and the assembly device 40 forming the lay-up device 1, some functions of the turn-over device 20 and the superimposition device 30 may not be performed depending on a type of the veneer to be assembled. Therefore, a case where the parallel veneer 100 is assembled without turning over the same is first described.

The turn-over controller 25 (refer to FIG. 5), the superimposition controller 37 (refer to FIG. 7), and the post-gluing conveyor controller 47 (refer to FIG. 9) communicate with each other to exchange various types of information during conveying the veneer. In addition to this, the turn-over device 20 is set in advance such that the turn-over controller 25 continuously or intermittently drives the driving motor 21b of the direction switching conveyor 21 to rotate forward and causes the driving motor 21e to stop. Meanwhile, the superimposition device 30 is set in advance such that the superimposition controller 37 continuously or intermittently drives the driving motor 31b of the pre-gluing conveyor 31 to rotate forward. Furthermore, the assembly device 40 is set in advance such that the post-gluing conveyor controller 47 continuously or intermittently drives the driving motor 41b of the fixed conveyor 41 to rotate forward and continuously drives the driving motor 42b of the movable conveyor 42 to rotate forward.

With such a configuration, the parallel veneer 100 is conveyed from the introduction device 10 through the direction switching conveyor 21 and the pre-gluing conveyor 31 to the gluing device 32 by which the adhesive is applied to the upper surface of the parallel veneer 100 and then to the post-gluing conveyor 33. The post-gluing conveyor 33 is normally in the extended state, and the veneers are continuously conveyed from the fixed conveyor 41 onto the movable conveyor 42 (veneer conveying step). In this case, the post-gluing conveyor controller 47 repeatedly executes a program indicating an assembling process illustrated in a flowchart of FIG. 11 at predetermined timing.

When receiving the detection signal from the veneer detecting sensor 45 (S11: YES), the post-gluing conveyor controller 47 drives the driving motor 43d to reversely rotate while maintaining the forward rotational driving of the driving motor 42b (S12: movable conveyor retracting step). According to this, the movable conveyor 42 is retracted from the extended position to the contracted position. After that, when receiving the detection signal from the conveyor detecting sensor 46 (S13: YES), the post-gluing conveyor controller 47 drives the driving motor 43d to rotate forward (S14: movable conveyor advancing step). According to this, the movable conveyor 42 advances from the contracted position to the extended position.

Figure 12A:
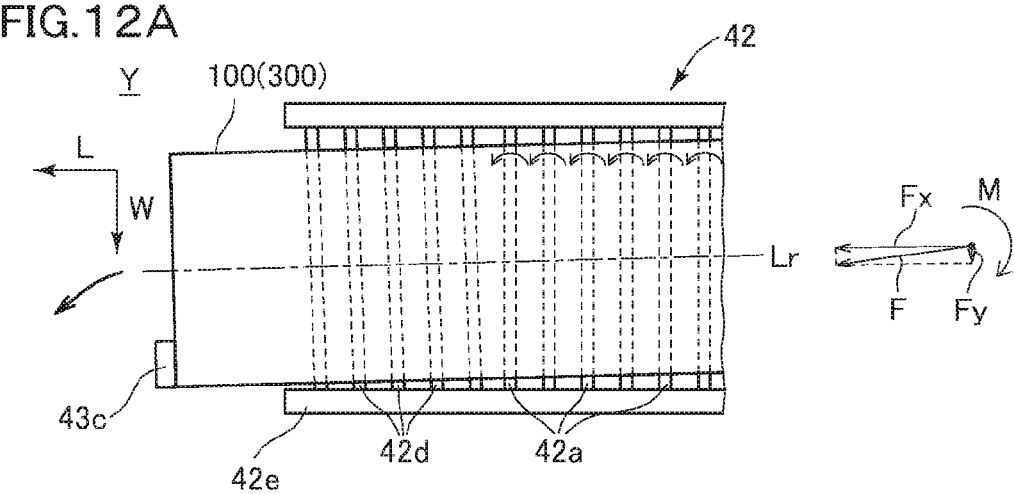
FIG. 12A is an illustration diagram illustrating a step corresponding to the assembling process of FIG. 11.

When conveyed on the movable conveyor 42, as illustrated in FIG. 12A, the veneer changes its course such that the leading end of the veneer is directed toward the inner side surface of the reference surface (ruler) 42e by the non-driving roller 42d. Accordingly, a center line of the veneer substantially aligns with a center line Lr of the non-driving roller 42d.

Since the movable conveyor 42 retracts while rotating the driving roller 42a forward, a driving force F caused by the driving roller 42a acts on the veneer in a direction of the center line Lr. Since the driving force F includes the component of force Fx in the longitudinal direction L and the component of force Fy in the width direction W of the conveyor, the veneer is pressed against the stopper member 43c by the component of force Fx and receives moment M of the force to move a rear end of the veneer to the reference surface (ruler) 42e of the movable conveyor 42 with a contact portion of the stopper member 43c as a rotational fulcrum by the component of force Fy.

Figure 12B:
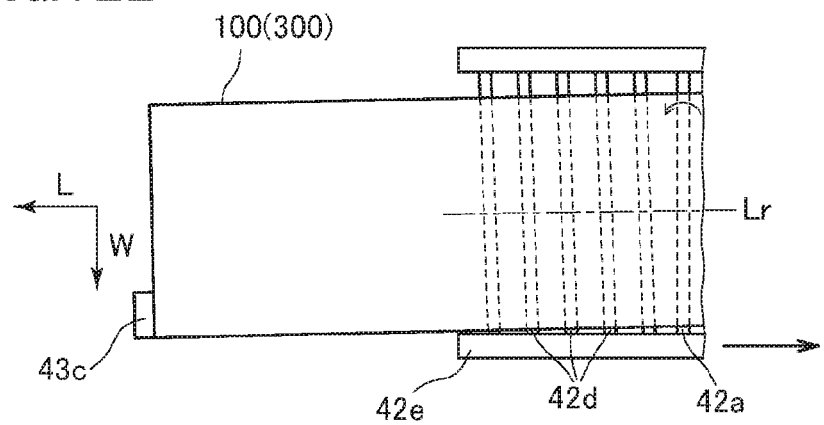
FIG. 12B is an illustration diagram illustrating a step corresponding to the assembling process of FIG. 11.
Figure 12C:
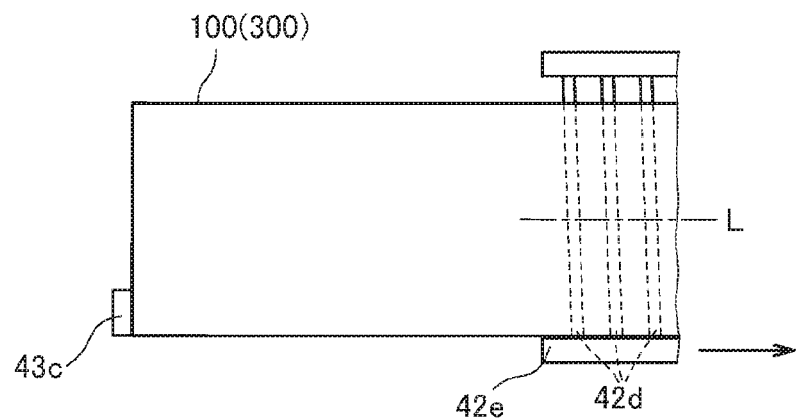
FIG. 12C is an illustration diagram illustrating a step corresponding to the assembling process of FIG. 11.

As a result, as illustrated in FIGS. 12B and 12C, along with retraction of the movable conveyor 42, the veneer is drawn such that the longitudinal edge of the veneer runs along the reference surface (ruler) 42e of the movable conveyor 42, and the veneer naturally drops to the assembling position X (refer to FIG. 10) from the leading end side of the veneer which is no longer supported by the movable conveyor 42 in a state in which the veneer is positioned in the reference right angle direction, that is to say, in a state in which the leading-side edge is positioned by the stopper member 43c and the longitudinal edge is positioned by the reference surface (ruler) 42e of the movable conveyor 42.

The assembled veneers W1 stacked in the assembling position X are automatically aligned.

A case where the turned over parallel veneer 100 is assembled is next described. By allowing the LVL to include the turned over parallel veneer 100, bending and warpage can be satisfactorily prevented. When the parallel veneer 100 is turned over, the turn-over controller 25 executes a program indicating a turn-over process illustrated in a flowchart of FIG. 13.

When receiving the detection signal from the veneer detecting sensor 23 (S21: YES), the turn-over controller 25 stops the driving of the driving motor 21b and stops the rotation of the driving roller 21a (S22, refer to FIG. 5). Subsequently, the turn-over controller 25 drives the driving motor 21g to rotate forward to cause each belt conveyor 21d to rotate from the original position to the operating position. Then, the turn-over controller 25 drives the driving motors 21e and 22d to rotate forward to cause each belt conveyor 21d and the outer belt 22g to rotate forward. Thus, the parallel veneer 100 is passed through the unit 22A and turned over (S23, refer to FIG. 6).

When receiving the detection signal from the veneer detecting sensor 24 (S24: YES), the turn-over controller 25 drives the driving motor 21e to reversely rotate for a predetermined period of time so that the parallel veneer 100 is mounted on each belt conveyor 21d (S25). When receiving the detection signal from the veneer detecting sensor 23 (S26: YES), the turn-over controller 25 drives the driving motor 21g to reversely rotate for a predetermined period of time to cause each belt conveyor 21d to rotate from the operating position to the original position so that the parallel veneer 100 is mounted on the driving roller 21a (S27).

Thereafter, the turn-over controller 25 drives the driving motor 21b to rotate forward (S28) and feeds the parallel veneer 100 to the pre-gluing conveyor 31 of the superimposition device 30. Thereafter, as in the case of assembling the parallel veneer 100 without turning over the same, the turned over parallel veneer 100 is stacked in the assembling position X by the assembly device 40 after the gluing device 32 applies the adhesive to the upper surface, that is to say, a rear surface of the parallel veneer 100.

Figure 14:
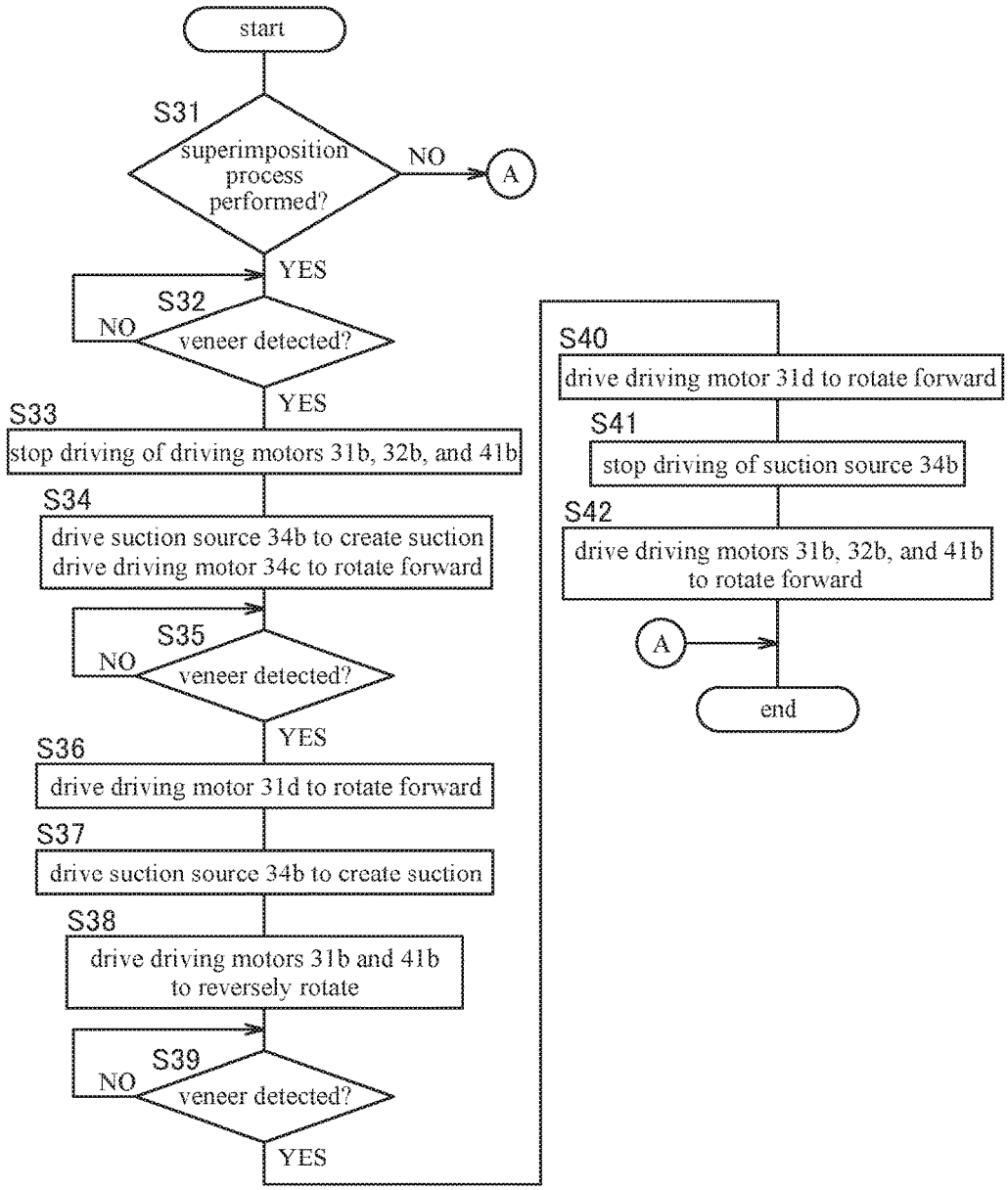
FIG. 14 is a flowchart illustrating a superimposing process executed by the superimposition device of FIG. 7.

A case of assembling the superimposed veneer 300 including the cross veneer 200 is next described. When the superimposed veneer 300 is manufactured, the superimposition controller 37 executes a program indicating a superimposing process illustrated in a flowchart of FIG. 14.

Figure 15A:
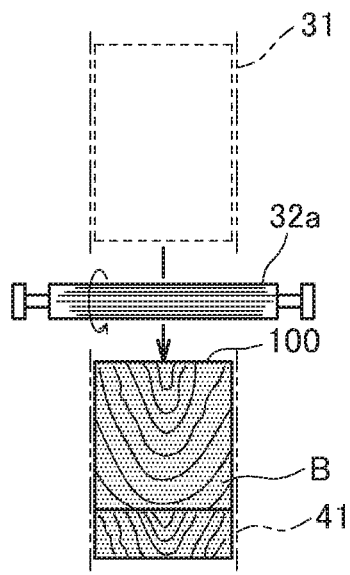
FIG. 15A is an illustration diagram illustrating a step corresponding to the superimposing process in FIG. 14.

In the case where the superimposing process is performed (S31: YES), when the parallel veneer 100 to which an adhesive B1 is applied by the gluing device 32 is fed to the fixed conveyor 41 of the post-gluing conveyor 33, the superimposition controller 37 decelerates the driving rollers 31a and 41a and the transferring roller 32a, in response to the input of the detection signal from the veneer detecting sensor 36 (S32: YES), and thereafter stops the driving of the driving motors 31b, 32b, and 41b, and allows the parallel veneer 100 to stand by on the fixed conveyor 41 of the post-gluing conveyor 33 (S33: parallel veneer standby step, refer to FIG. 15A).

Figure 15B:
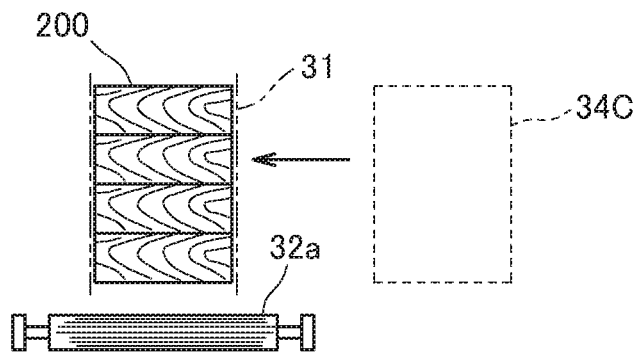
FIG. 15B is an illustration diagram illustrating a step corresponding to the superimposing process in FIG. 14.
Figure 15C:
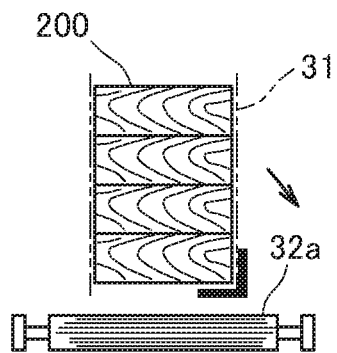
FIG. 15C is an illustration diagram illustrating a step corresponding to the superimposing process in FIG. 14.

Subsequently, the superimposition controller 37 drives the suction source 34b to create suction and drives the lifting mechanism and the driving motor 34c to move one of the cross veneers 200 stacked on the loading device 34C to the pre-gluing conveyor 31 (S34: cross veneer moving step, refer to FIG. 15B). When the cross veneer 200 is loaded onto the pre-gluing conveyor 31, the superimposition controller 37 drives the driving motor 31d to rotate forward, in response to the input of the detection signal from the veneer detecting sensor 35 (S35: YES), and positions the cross veneer 200 in the reference position of the pre-gluing conveyor 31 (S36: cross veneer positioning step, refer to FIG. 15C). Thereafter, the superimposition controller 37 drives the suction source 34b to create suction and drives the lifting mechanism so that the cross veneer 200 that has been positioned is put into a standby state in the position above the pre-gluing conveyor 31 (S37: cross veneer standby step).

Figure 15D:
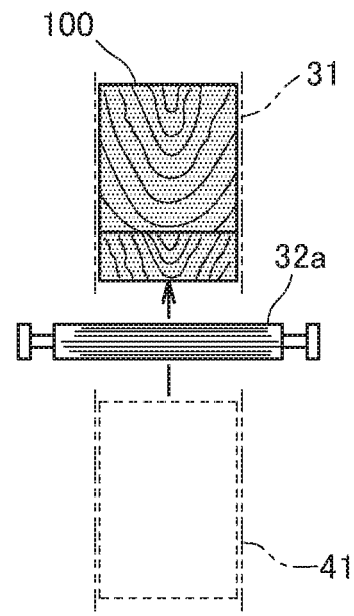
FIG. 15D is an illustration diagram illustrating a step corresponding to the superimposing process in FIG. 14.
Figure 15E:
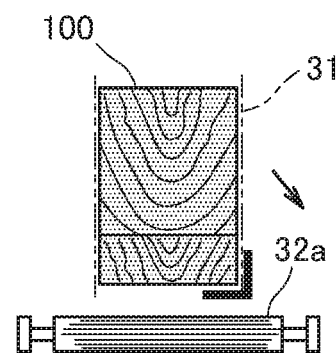
FIG. 15E is an illustration diagram illustrating a step corresponding to the superimposing process in FIG. 14.

Subsequently, in a state in which the lifting mechanism 32d of the gluing device 32 is driven and the transferring roller 32a is separated to the non-application position, the superimposition controller 37 drives the driving motors 31b and 41b to reversely rotate to return the parallel veneer 100 in the standby state from the fixed conveyor 41 onto the pre-gluing conveyor 31 (S38: parallel veneer returning step, refer to FIG. 15D). When receiving the detection signal from the veneer detecting sensor 35 (S39: YES), the superimposition controller 37 drives the driving motor 31d to rotate forward and positions the parallel veneer 100 in the reference position of the pre-gluing conveyor 31 (S40: parallel veneer positioning step, refer to FIG. 15E).

Figure 15F:
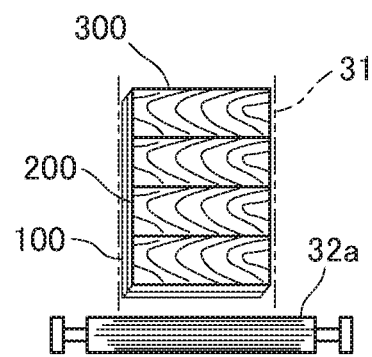
FIG. 15F is an illustration diagram illustrating a step corresponding to the superimposing process in FIG. 14.

Thereafter, the superimposition controller 37 drives the lifting mechanism of the main body 34A to stop driving the suction source 34b such that the cross veneer 200 in the standby state is superimposed on the parallel veneer 100 that has been positioned (S41: superimposing step, refer to FIG. 15F). Thereafter, the main body 34A is returned to the original position on the loading device 34C.

Figure 15G:
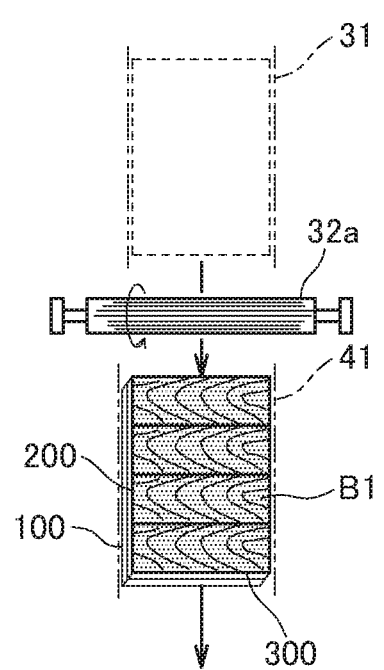
FIG. 15G is an illustration diagram illustrating a step corresponding to the superimposing process in FIG. 14.

Then, the superimposition controller 37 drives the lifting mechanism 32d of the gluing device 32 to move the transferring roller 32a to the application position, then drives the driving motors 31b, 32b, and 41b to rotate forward, and applies the adhesive B1 to the upper surface of the cross veneer 200 in the superimposed veneer 300 (S42: superimposed veneer gluing step, refer to FIG. 15G). Thereafter, as in the cases where the parallel veneer 100 is assembled without turning over the same and where the turned over parallel veneer 100 is assembled, the superimposed veneer 300 is stacked in the assembling position X by the assembly device 40.

As is clear from the above-description, in the first embodiment, the movable conveyor 42 is provided, in its front portion, with the non-driving roller 42d (guiding roller) disposed so as to be inclined toward the reference surface (ruler) 42e at a predetermined angle with respect to the width direction W orthogonal to the longitudinal direction L of the movable conveyor 42 such that the leading end of the veneer is guided toward the reference surface (ruler) 42e (one lateral side of the movable conveyor 42), and the movable conveyor 42 is set to retract in the contracting direction in a state in which the forward rotational driving of the driving roller 42a is maintained.

That is to say, in the first embodiment, it is set that the driving motor 41b of the fixed conveyor 41 and the driving motor 42b of the movable conveyor 42 are driven to rotate forward such that the veneers are continuously conveyed from the fixed conveyor 41 onto the movable conveyor 42 in the extended state of the post-gluing conveyor 33 (veneer conveying step), the movable conveyor 42 in the extended state is retracted in the contracting direction while maintaining the forward rotational driving of the driving motor 42b of the movable conveyor 42 when the veneer is brought into contact with the stopper member 43c (S12: movable conveyor retracting step), and after the movable conveyor 42 reaches a retracted position, the movable conveyor 42 is advanced again in the extending direction (S14: movable conveyor advancing step).

Therefore, the force Fx in the direction to press the veneer against the stopper member 43c acts on the veneer, and the force Fy in the direction to draw the veneer toward the reference surface (ruler) 42e of the movable conveyor 42 acts on the veneer, so that the veneer is drawn such that the longitudinal edge of the veneer runs along the reference surface (ruler) 42e of the movable conveyor 42, and the veneer naturally drops to the assembling position X from the leading end side of the veneer which is no longer supported by the movable conveyor 42 in a state in which the leading-side edge is positioned by the stopper member 43c and the longitudinal edge is positioned by the reference surface (ruler) 42e of the movable conveyor 42. In this manner, it is possible to automatically align the veneers in the assembling position X using only the post-gluing conveyor 33.

In addition, in the first embodiment, the driving roller 42a and the non-driving roller 42d of the movable conveyor 42 are disposed so as to be inclined downward with respect to the longitudinal horizontal direction Lh of the movable conveyor such that the driving roller 42a and the non-driving roller 42d are located on a lower side toward a forward direction of the movable conveyor 42. Accordingly, when the veneer naturally drops to the assembling position X, the veneer is more likely to drop obliquely downward from the leading end side of the veneer, a gap between the veneer and the assembling position X becomes smaller and the veneer is less likely to be subjected to air resistance, so that it is more easily to automatically align the veneer.

Meanwhile, although the guiding roller located in the front portion of the movable conveyor 42 is the non-driving roller 42d in the first embodiment, the guiding roller may be the driving roller (guiding driving roller) in place of the non-driving roller 42d. In this case, when the movable conveyor 42 retracts in the contracting direction, these guiding driving rollers may be in a non-driving state (free state) or may be maintained in a forward rotational driving state like the driving roller 42a.

In addition, in the first embodiment, the turn-over device 20 is provided with: the inner belt 22c (first belt) wound between the large-diameter drum 22a (first drum member) and the small-diameter drum 22b (second drum member); the outer belt 22g (second belt) wound around the large-diameter drum 22a so as to be pressed against the inner belt 22c; the driving motor 22d, the transmitting mechanism 22e, and the driving roller 22f (driving means) which drive the outer belt 22g to rotate; and a plurality of belt conveyors 21d (supplying means) capable of supplying the parallel veneer 100 on the direction switching conveyor 21 between the inner belt 22c and the outer belt 22g. The parallel veneer 100 supplied between the inner belt 22c and the outer belt 22g by synchronous rotation of the respective belt conveyors 21d is turned over along the circumferential surface of the large-diameter drum 22a in a state of being interposed between the outer belt 22g and the inner belt 22c following the outer belt 22g in accordance with the rotation of the outer belt 22g, and is guided by the inner belt 22c which is inclined downward so as to extend obliquely downward from the large-diameter drum 22a to the small-diameter drum 22b to be ejected onto the respective belt conveyors 21d.

Accordingly, the turned over parallel veneer 100 can be smoothly ejected onto the respective belt conveyors 21d, and can be satisfactorily prevented from being damaged due to dropping or the like.

In the first embodiment, the superimposing process (refer to FIG. 14) includes the parallel veneer standby step (S33) of allowing the parallel veneer 100 glued by the gluing device 32 to stand by on the post-gluing conveyor 33, the cross veneer moving step (S34) of moving the cross veneers 200 one by one from the loading device 34C of the cross veneer supply device 34 onto the pre-gluing conveyor 31, the cross veneer positioning step (S36) of positioning the cross veneer 200 in the reference position of the pre-gluing conveyor 31, the cross veneer standby step (S37) of allowing the cross veneer 200 that has been positioned to stand by in the position above the pre-gluing conveyor 31, the parallel veneer returning step (S38) of returning the parallel veneer 100 in the standby state onto the pre-gluing conveyor 31, the parallel veneer positioning step (S40) of positioning the parallel veneer 100 that has been returned in the reference position of the pre-gluing conveyor 31, the superimposing step (S41) of superimposing the cross veneer 200 in the standby state on the parallel veneer 100 that has been positioned, and the superimposed veneer gluing step (S42) of gluing the upper surface of the cross veneer 200 on the parallel veneer 100.

Accordingly, since both the parallel veneer 100 and the cross veneer 200 are positioned in the reference position of the pre-gluing conveyor 31, it is possible to obtain the superimposed veneer 300 in which the corresponding edges of the parallel veneer 100 and the cross veneer 200 substantially align with each other. In addition, the transferring roller 32a (adhesive applying roller) applies high roller pressure and adhesive force to the superimposed veneer 300 in which the cross veneer 200 is superimposed on the parallel veneer 100, as compared with a case of the parallel veneer 100, so that the parallel veneer 100 and the cross veneer 200 easily fit in each other, and are bonded with a high degree of adhesion. Furthermore, in a case of a bonding method using the transferring roller 32a, if the roller axis is parallel to the fiber direction, the veneer might be pulled into the roller. Thus, dedicated transferring rollers are conventionally often used for the parallel veneer 100 and the cross veneer 200 in order that the roller axis may be orthogonal to the fiber direction. However, in the case of applying the adhesive B1 to the cross veneer 200 as in the first embodiment, the superimposed veneer 300 in which the cross veneer 200 is superimposed on the parallel veneer 100 is less likely to be pulled into the roller, so that it is sufficient to use only the transferring roller 32a for the parallel veneer. As a result, it is possible to satisfactorily apply the adhesive B1 to the upper surface of the cross veneer 200 while simplifying the facility.

Note that, in the configuration of the first embodiment, although the cross veneer moving step, the cross veneer positioning step, and the cross veneer standby step are performed in this order after the parallel veneer standby step, alternatively, the cross veneer moving step, the cross veneer positioning step, and the cross veneer standby step may first be performed in this order for example, then, after applying the adhesive to the parallel veneer, the parallel veneer returning step may be performed without performing the parallel veneer standby step, and thereafter the parallel veneer positioning step, the superimposing step, and the superimposed veneer gluing step may be performed in this order. According to this variation also, it is possible to obtain the superimposed veneer 300 in which the corresponding edges of the parallel veneer 100 and the cross veneer 200 substantially align with each other, as in the first embodiment.

In addition, this invention is not limited to the first embodiment and the like, and may be carried out in various modified modes without departing from the spirit of the invention.

REFERENCE SIGNS LIST

1 Lay-up device
10 Introduction device
20 Turn-over device
21 Direction switching conveyor
22 Turn-over mechanism
23, 24 Veneer detecting sensor
25 Turn-over controller
30 Superimposition device
31 Pre-gluing conveyor
32 Gluing device
33 Post-gluing conveyor (sliding extendable roller conveyor)
34 Cross veneer supply device
35, 36 Veneer detecting sensor
37 Superimposition controller
40 Assembly device
41 Fixed conveyor
41a Driving roller
42 Movable conveyor
42a Driving roller
42d Non-driving roller (guiding roller)
42e Reference surface (ruler) (one lateral side)
43 Fixed frame
43c Stopper member
44 Loading device
45 Veneer detecting sensor (veneer detecting means)
46 Conveyor detecting sensor
47 Post-gluing conveyor controller (roller control means, slide movement control means)
100 Parallel veneer (veneer)
200 Cross veneer
300 Superimposed veneer (veneer)
X Assembling position
Y Veneer stopping position
W1 Assembled veneer

The invention claimed is:

1. A veneer assembly device comprising:
a sliding extendable roller conveyor including a fixed conveyor and a movable conveyor for conveying a veneer that has been glued to a veneer stopping position corresponding to a position above a predetermined assembling position,
the sliding extendable roller conveyor being alternatively switchable between an extended state in which the movable conveyor is advanced so as to be pushed out from an inside to an outside of the fixed conveyor and a contracted state in which the movable conveyor is retracted so as to be pulled from the outside to the inside of the fixed conveyor,
the movable conveyor being provided, in its front portion, with a guiding roller disposed so as to be inclined toward one lateral side at a predetermined angle with respect to a width direction orthogonal to a longitudinal direction of the movable conveyor such that a leading end of the veneer is guided toward the one lateral side as a reference surface in the longitudinal direction of the movable conveyor,
the veneer assembly device further comprising:
veneer detecting means which detects the veneer reaching the veneer stopping position with a leading-side edge of the veneer being brought into contact with a predetermined stopper member;
roller control means which drives each driving roller of the fixed conveyor and the movable conveyor to rotate forward such that the veneer is conveyed to the veneer stopping position; and
slide movement control means which controls slide movement of the movable conveyor,
wherein the roller control means drives each driving roller of the fixed conveyor and the movable conveyor to rotate forward such that the veneer is continuously conveyed from the fixed conveyor onto the movable conveyor in the extended state of the sliding extendable roller conveyor,
wherein, when the veneer is detected by the veneer detecting means, the slide movement control means retracts the movable conveyor in the extended state, in a contracting direction in a state in which forward rotational driving of the driving roller of the movable conveyor is maintained by the roller control means, the veneer receives moment of force in a direction to move a rear end of the veneer toward the one lateral side of the movable conveyor with a contact portion of the veneer with the stopper member as a rotational fulcrum by a driving force based on the forward rotational driving of the driving roller of the movable conveyor which is retracting, and the veneer is drawn such that a longitudinal edge runs along the one lateral side of the movable conveyor and the veneer naturally drops from the veneer stopping position to the assembling position in a state in which the leading-side edge is positioned by the stopper member and the longitudinal edge is positioned by the one lateral side of the movable conveyor.

2. The veneer assembly device according to claim 1, wherein the guiding roller is formed of a plurality of non-driving rollers.

3. The veneer assembly device according to claim 2, wherein the driving roller and the non-driving roller of the movable conveyor are disposed so as to be inclined downward with respect to a longitudinal horizontal direction of the movable conveyor such that the driving roller and the non-driving roller are located on a lower side toward a forward direction of the movable conveyor.

4. A veneer assembling method using a veneer assembly device provided with:
a sliding extendable roller conveyor including a fixed conveyor and a movable conveyor for conveying a veneer that has been glued to a veneer stopping position corresponding to a position above a predetermined assembling position; the sliding extendable roller conveyor being alternatively switchable between an extended state in which the movable conveyor is slid so as to be pushed out from an inside to an outside of the fixed conveyor and a contracted state in which the movable conveyor is slid so as to be pulled from the outside to the inside of the fixed conveyor in a longitudinal direction of the fixed conveyor,
the movable conveyor being provided, in its front portion, with a guiding roller disposed so as to be inclined toward one lateral side at a predetermined angle with respect to a width direction orthogonal to a longitudinal direction of the movable conveyor such that a leading end of the veneer is guided toward the one lateral side as a reference surface in a longitudinal direction of the movable conveyor,
the veneer assembling method comprising:
a veneer conveying step of driving each driving roller of the fixed conveyor and the movable conveyor to rotate forward such that the veneer is continuously conveyed from the fixed conveyor onto the movable conveyor in the extended state of the sliding extendable roller conveyor;

a movable conveyor retracting step of retracting the movable conveyor in the extended state, in a contracting direction in a state in which forward rotational driving of the driving roller of the movable conveyor is maintained when the veneer is brought into contact with a predetermined stopper member, with the veneer receiving moment of force in a direction to move a rear end of the veneer toward the one lateral side of the movable conveyor with a contact portion of the veneer with the stopper member as a rotational fulcrum by a driving force based on the forward rotational driving of the driving roller of the movable conveyor which is retracting; and a movable conveyor advancing step of advancing the movable conveyor in an extending direction after the movable conveyor retracting step.

* * * * *